United States Patent
Petschnigg et al.

(10) Patent No.: US 7,457,477 B2
(45) Date of Patent: Nov. 25, 2008

(54) DIGITAL PHOTOGRAPHY WITH FLASH/NO FLASH EXTENSION

(75) Inventors: Georg F. Petschnigg, Seattle, WA (US);
Richard Szeliski, Bellevue, WA (US);
Michael F. Cohen, Seattle, WA (US);
Hugues Hoppe, Redmond, WA (US);
Maneesh Agrawala, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 757 days.

(21) Appl. No.: 10/885,259

(22) Filed: Jul. 6, 2004

(65) Prior Publication Data
US 2006/0008171 A1    Jan. 12, 2006

(51) Int. Cl.
*H04N 5/222* (2006.01)
*G06K 9/00* (2006.01)
*G06K 9/62* (2006.01)
*G06K 9/40* (2006.01)

(52) U.S. Cl. ............... 382/274; 382/100; 382/209; 382/254; 382/260; 348/370

(58) Field of Classification Search ............... 382/260, 382/263, 264, 266, 274, 275, 294, 254
See application file for complete search history.

(56) References Cited

U.S. PATENT DOCUMENTS

| | | | |
|---|---|---|---|
| 6,005,959 A | | 12/1999 | Mohan et al. |
| 6,088,470 A | * | 7/2000 | Camus et al. ............... 382/117 |
| 6,728,401 B1 | * | 4/2004 | Hardeberg ............... 382/167 |
| 6,744,471 B1 | * | 6/2004 | Kakinuma et al. ........... 348/371 |
| 7,295,716 B1 | * | 11/2007 | Chinen et al. ............... 382/274 |
| 2002/0150306 A1 | * | 10/2002 | Baron ........................ 382/275 |
| 2004/0136603 A1 | * | 7/2004 | Vitsnudel et al. ........... 382/254 |
| 2004/0183812 A1 | * | 9/2004 | Raskar et al. ............... 345/582 |
| 2005/0063605 A1 | * | 3/2005 | Huang et al. ................ 382/260 |
| 2006/0132642 A1 | * | 6/2006 | Hosaka et al. .............. 348/370 |
| 2007/0025717 A1 | * | 2/2007 | Raskar et al. ............... 396/155 |
| 2007/0153335 A1 | * | 7/2007 | Hosaka ........................ 358/463 |
| 2007/0165960 A1 | * | 7/2007 | Yamada ........................ 382/254 |

OTHER PUBLICATIONS

"Illuminating Illumination".Jeffrey M. DiCarlo, Feng Xiao and Brian A Wandell, Ninth Color Imaging Conference, pp. 27-34, 2001.*

Petschnigg G et al: "Digital photography with flash and no-flash image pairs" Proceedings ACM Siggraph, Aug. 8, 2004, pp. 664-672.*

Debevec, P. 1997. Recovering High Dynamic Range Radiance Maps from Photographs. ACM, Siggraph 1997.*

(Continued)

*Primary Examiner*—Samir A Ahmed
*Assistant Examiner*—Gandhi Thirugnanam
(74) *Attorney, Agent, or Firm*—Amin, Turocy & Calvin, LLP

(57) ABSTRACT

A system and method for improving digital flash photographs. The present invention is a technique that significantly improves low-light imaging by giving the end-user all the advantages of flash photography without producing the jarring look. The invention uses an image pair—one taken with flash the other without—to remove noise from the ambient image, sharpen the ambient image using detail from the flash image, correct for color, and remove red-eye.

31 Claims, 18 Drawing Sheets

OTHER PUBLICATIONS

Eisemann et al: "Flash Photography Enhancement via Intrinsic Relighting" Proceedings ACM Siggraph, Aug. 8, pp. 673-678.*
http://research.microsoft.com/projects/FlashNoFlash/ Sep. 4, 2004.*
Paris et al., "A Fast Approximation of the Bilateral Filter Using a Signal Processing Approach", Dec. 18, 2007, Int. J. Computer Vision. p. 1-29.*
Braun et al., "Information Fusion of Flash and Non-Flash Images", Dec. 31, 2002, URL: http://graphics.stanford.edu/{georgp/vision.htm>, last accessed on Sep. 14, 2006.
DiCarlo, et al., "Illuminating Illumination", Proceedings of 9th Color Imaging Conference, Nov. 6, 2001, pp. 27-34.
Durand et al., "Fast Bilateral Filtering for the Display of High-Dynamic-Range Images" ACM Transactions on Graphics, ACM, New York, NY, US, vol. 21, No. 3, Jul. 2002, pp. 257-266.
Petschnigg et al., "Digital photography with flash and no-flash image pairs" Proceedings ACM Siggraph, Aug. 8, 2004, pp. 664-672.
European Search Report dated Nov. 2, 2006 for European Patent Application Serial No. 05106140.6-2218 3 Pages.
Georg Petschnigg, et al., Digital Photography with Flash and No-Flash Image Pairs, ACM Transactions on Graphics (Proceedings of Siggraph 2004), Jul. 14, 2004, 9 pages.
Georg Petschnigg, Redeye Removal Using Flash and Non Flash Image Pairs, http://burg-pyrmont.de/georgp/RedEye/details.htm, Jun. 2002, 10 pages.
Georg Petschnigg, Redeye Removal Using Flash and Non-Flash Image Pairs, http://burg-pyrmont.de/georgp/RedEye/index.htm, Jun. 2002, 2 pages.
Georg Petschnigg, FlashSharpen—Active Denoising of Scene Illuminated Images Using Flash, http://burg-pyrmont.de/georgp/FlashSharpen/index.htm, Jun. 2002, 3 pages.
Mike Braun, et al., Information Fusion of Flash and Non-Flash Images, CS223b Final Project, http://burg-pyrmont.de/georgp/vision.htm, 2002, 13 pages.

* cited by examiner

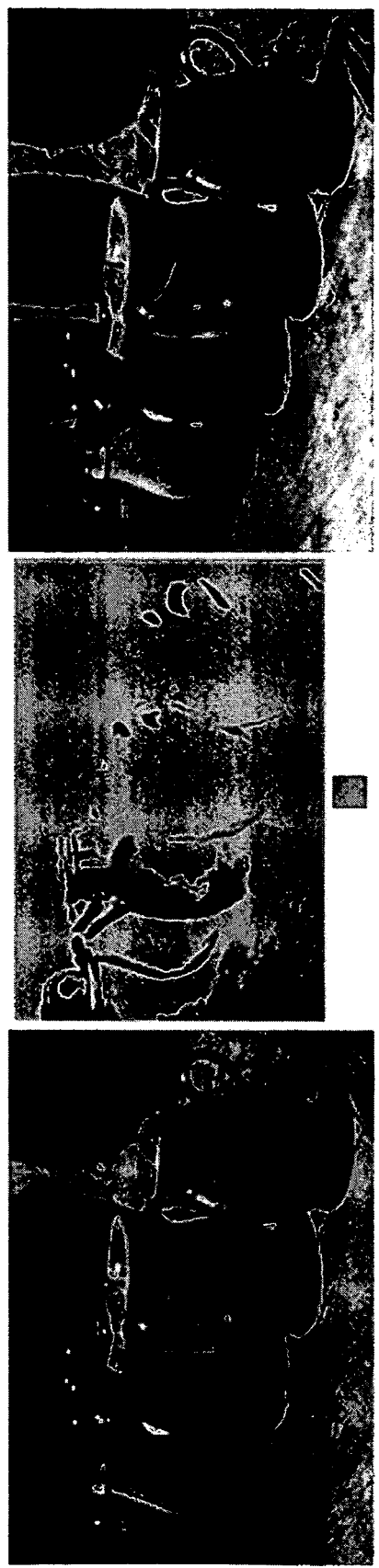
FIG. 13c
FIG. 13b
FIG. 13a
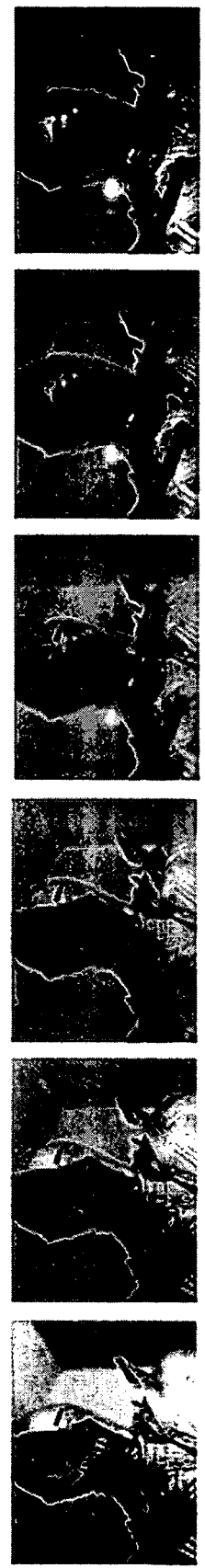
FIG. 15f
FIG. 15e
FIG. 15d
FIG. 15c
FIG. 15b
FIG. 15a

DIGITAL PHOTOGRAPHY WITH FLASH/NO FLASH EXTENSION

TECHNICAL FIELD

This invention is related to digital photography, and more specifically to mechanisms for improving the quality of digital flash photographs.

BACKGROUND OF THE INVENTION

An important goal of photography is to capture and reproduce the visual richness of a real environment. Lighting is an integral aspect of this visual richness and often sets the mood or atmosphere in the photograph. The subtlest nuances are often found in low-light conditions. For example, the dim, orange hue of a candlelit restaurant can evoke an intimate mood, while the pale blue cast of moonlight can evoke a cool atmosphere of mystery.

When capturing the natural ambient illumination in such low-light environments, photographers face a dilemma. One option is to set a long exposure time so that the camera can collect enough light to produce a visible image. However, camera shake or scene motion during such long exposures will result in motion blur. Another option is to open the aperture to let in more light. However, this approach reduces depth of field and is limited by the size of the lens. The third option is to increase the camera's gain, which is controlled by the ISO setting. However, when exposure times are short, the camera cannot capture enough light to accurately estimate the color at each pixel, and thus visible image noise increases significantly.

Flash photography was invented to circumvent these problems. By adding artificial light to nearby objects in the scene, cameras with flash can use shorter exposure times, smaller apertures, and less sensor gain and still capture enough light to produce relatively sharp, noise-free images. Brighter images have a greater signal-to-noise ratio and can therefore resolve detail that would be hidden in the noise in an image acquired under ambient illumination. Moreover, the flash can enhance surface detail by illuminating surfaces with a crisp point light source. Finally, if one desires a white-balanced image, the known flash color greatly simplifies this task.

As photographers know, however, the use of flash can also have a negative impact on the lighting characteristics of the environment. Objects near the camera are disproportionately brightened, and the mood evoked by ambient illumination may be destroyed. In addition, the flash may introduce unwanted artifacts such as red eye, harsh shadows, and specularities, none of which are part of the natural scene. Despite these drawbacks, many amateur photographers use flash in low-light environments, and consequently, these snapshots rarely depict the true ambient illumination of such scenes.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises a system and method for improving digital flash photographs. Flash photography in general looks bad. The present invention overcomes many of the drawbacks and shortcomings of the prior art by providing a technique that significantly improves low-light imaging by giving the end-user all the advantages of flash photography without producing the jarring look. In operation, the present invention uses an image pair—one taken with flash the other, the ambient image, without—to remove noise from the ambient image, sharpen the ambient image using detail from the flash image, correct for color, and remove red-eye.

In one aspect thereof, the present invention uses the flash image's better signal characteristics to drive the de-noising of the ambient image.

In another aspect of the present invention, the present invention uses the fact that the color exposed by the flash is known to more robustly estimate the ambient illumination in the non-flash image, to create a more natural looking ambient image.

In yet another aspect thereof, a variety of applications are provided that analyze and combine the strengths of such flash/no-flash image pairs. These applications include denoising and detail transfer (to merge the ambient qualities of the no-flash image with the high-frequency flash detail), white-balancing (to change the color tone of the ambient image), continuous flash (to interactively adjust flash intensity), and red-eye removal (to repair artifacts in the flash image).

In still another aspect of the present invention, manual acquisition of the flash/no-flash pair is provided that is relatively straightforward with current consumer digital cameras.

To the accomplishment of the foregoing and related ends, certain illustrative aspects of the invention are described herein in connection with the following description and the annexed drawings. These aspects are indicative, however, of but a few of the various ways in which the principles of the invention can be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 9b shows the detail transfer with denoising of FIG. 9a.

FIG. 11b shows the detail transfer image for the no-flash image of FIG. 11a.

FIG. 11f shows a flash image of the small section indicated in the no-flash image of FIG. 11a.

FIG. 13a shows an original no-flash image after denoising and detail transfer, but which still shows a cast.

FIG. 13b shows the estimated ambient illumination colors and the estimated overall scene ambience.

FIG. 13c shows that the white-balancing algorithm shifts the colors and removes a certain coloring.

FIG. 15a shows an out-of-range extreme at the low end with a setting at −0.5.

FIG. 15b shows the no-flash image at 0.0.

FIG. 15c shows an extrapolated image with a 0.33 setting.

FIG. 15d shows an extrapolated image with a 0.66 setting.

FIG. 15e shows the flash image at the 1.0 setting.

FIG. 15f shows an extrapolated image with an out-of-range extreme at the high end at 1.5.

DETAILED DESCRIPTION OF THE INVENTION

Figure 1:
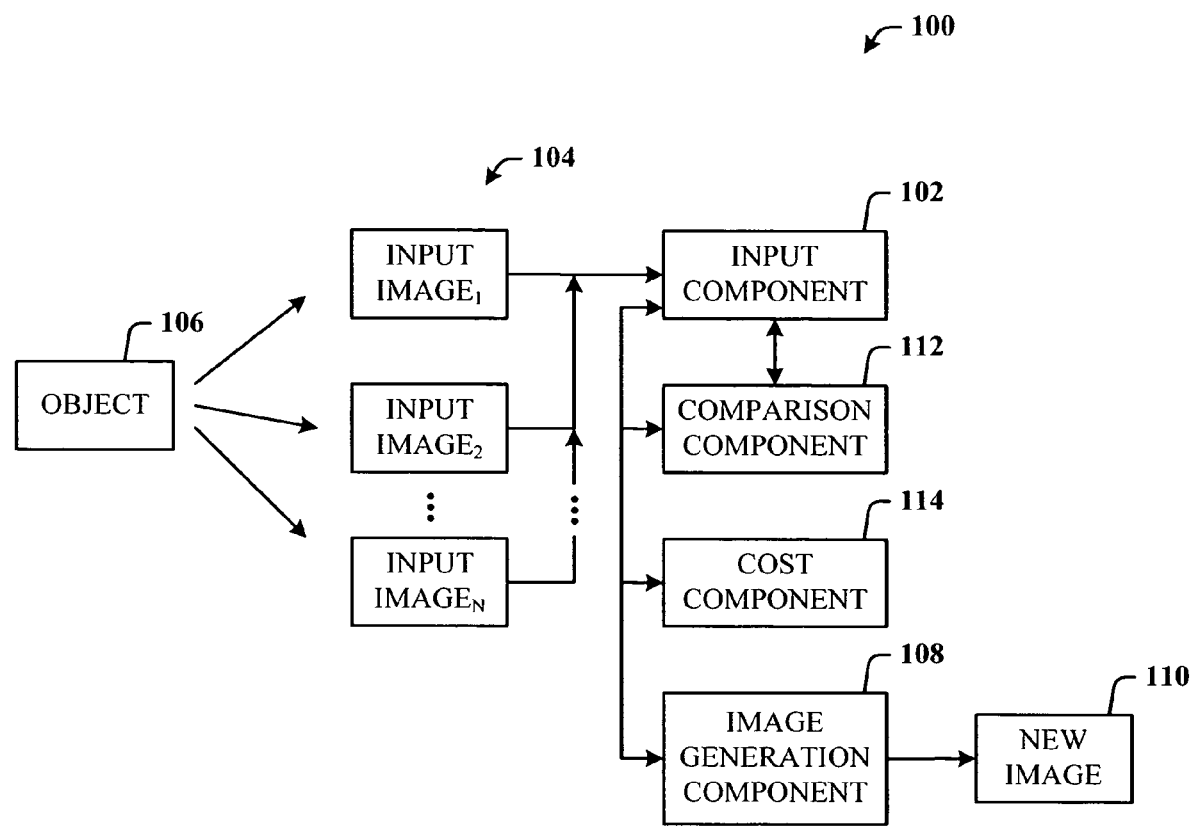
FIG. 1 illustrates a system that facilitates digital image generation using flash/no-flash image pairs in accordance with the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention can be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

The present invention overcomes many of the drawbacks and shortcomings of the prior art by providing a technique that significantly improves low-light imaging by giving the end-user all the advantages of flash photography without producing the jarring look. In operation, the present invention uses an image pair—one taken with flash, the other without (the "ambient" image)—to remove noise from the ambient image, sharpen the ambient image using detail from the flash image, correct for color, and remove red-eye. In one embodiment, the present invention uses the better signal-to-noise characteristics of a flash image to drive the denoising of an ambient (or no-flash) image. In a second embodiment, the present invention uses the fact that color exposed by the flash is known to more robustly estimate the ambient illumination in the non-flash image, to create a more natural looking ambient image.

Referring now to FIG. 1, there is illustrated a system 100 that facilitates digital image generation using flash/no-flash image pairs in accordance with the present invention. The system 100 includes an input component 102 that receives a plurality of digital images 104 (denoted INPUT IMAGE$_1$, INPUT IMAGE$_2$, . . . , INPUT IMAGE$_N$) generated of an object 106. At least two of the digital images 104 have differing illumination components. An image generation component 108 merges a subset of the input images 104 to generate a new image 110 of the object 106. The image generation component 108 merges high frequency components of one input image with low frequency components of another input image in generating the new image 110, thereby enhancing one image by adding detail from another image.

The new image 110 is generated using at least two of the input images 104, one image taken with flash lighting, and a second image taken without flash lighting. Such images can be taken using, for example, a digital camera or video camera (also called a camcorder) that employ the system 100.

The system 100 also employs a comparison component 112 that identifies image artifacts by analyzing at least two of the input images 104. Such artifacts can include red-eye coloration, shadows, and noise. A cost component 114 applies a cost function to the frequency components to mitigate combining disagreeing frequency components. The cost component 114 is part of an algorithm that first splits the flash/no-flash images into their respective low and high pass components. Lastly, the images are combined using the cost function which is expressed as a blending mask.

Figure 2:
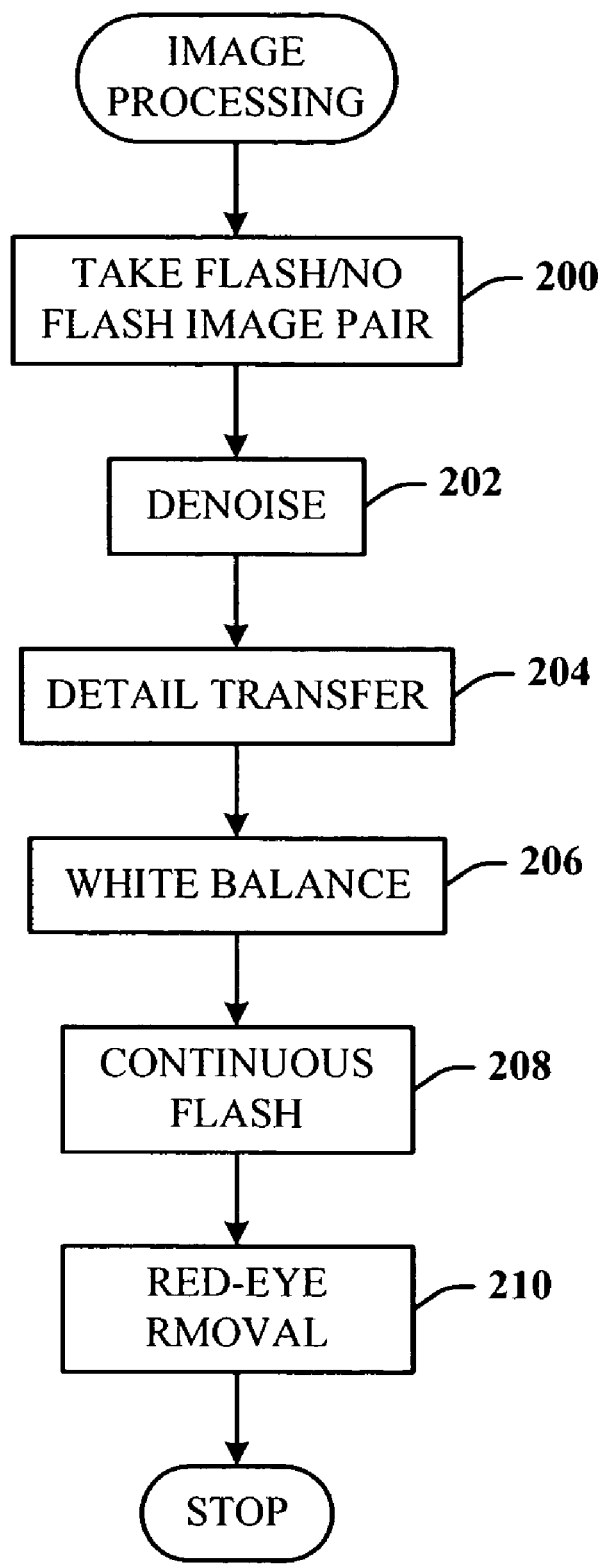
FIG. 2 illustrates a flow chart of one methodology for new image generation in accordance with the present invention.

Referring now to FIG. 2, there is illustrated a flow chart of one methodology for new image generation in accordance with the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Today, digital photography makes it fast, easy, and economical to take a pair of images of low-light environments: one with flash ("flash") to capture detail and one without flash ("no-flash") to capture ambient illumination. At 200, the flash/no-flash images are taken of the object or scene. At 202, ambient image denoising is performed. The relatively noise-free flash image is used to reduce noise in the no-flash image. By maintaining the natural lighting of the ambient image, the new (or output) image is created that looks closer to the real scene. At 204, flash-to-ambient detail is transferred. High-frequency detail is transferred from the flash image to the denoised ambient image, since this detail may not exist in the original ambient image. At 206, white balancing is performed. The user may desire to simulate a whiter illuminant while preserving the "feel" of the ambient image. The known flash color is exploited to white-balance the ambient image, rather than relying on traditional single-image heuristics. At 208, continuous flash intensity adjustment can be optionally provided. Continuous interpolation control is provided between the image pair so that the user can interactively adjust the flash intensity. The user can even extrapolate beyond the original ambient and flash images. At 210, red-eye correction is performed. Red-eye detection is performed by considering how the color of the pupil changes between the ambient and flash images. The process then reaches a Stop block. Thus, the present invention exploits information of the flash/no-flash pair to improve upon conventional techniques.

One feature of the present invention is the manual acquisition of the flash/no-flash pair that is relatively straightforward with current consumer digital cameras. In support thereof, the capability to capture such pairs can move into the camera firmware, thereby making the acquisition process even easier and faster.

Background on Camera Noise

The intuition behind several disclosed algorithms is that while the illumination from a flash may change the appearance of the scene, it also increases the signal-to-noise ratio (SNR) in the flash image and provides a better estimate of the high-frequency detail. The digital sensor produces similar log power spectra for the flash and ambient images. According to the capabilities of one conventional CCD (Charge Coupled Device) camera, a brighter image signal contains more noise than a darker signal. However, the absolute gain in signal power is disproportionately larger than the increase in noise. Thus, the SNR of the brighter image is better. While the flash does not illuminate the scene uniformly, it does significantly increase scene brightness (especially for objects near the camera) and therefore, the flash image exhibits a better SNR than the ambient image. With regard to the digital sensor, the noise dominates the signal at a lower frequency in the high-ISO (International Standards Organization film sensitivity measure) ambient image than in the low-ISO flash image.

The improvement in SNR in a flash image is especially pronounced at higher frequencies. Properly exposed image pairs have similar intensities after passing through the imaging system (which may include aperture, shutter/flash duration, and camera gain, for example). Therefore, the log power spectra are roughly the same. However, the noise in the high-ISO ambient image is greater than in the low-ISO flash image because the gain amplifies the noise. Since the power spectrum of most natural images falls off at high frequencies, whereas that of the camera noise remains uniform (i.e., assuming white noise), noise dominates the signal at a much lower frequency in the ambient image than in the flash image.

Acquisition

Figure 3:
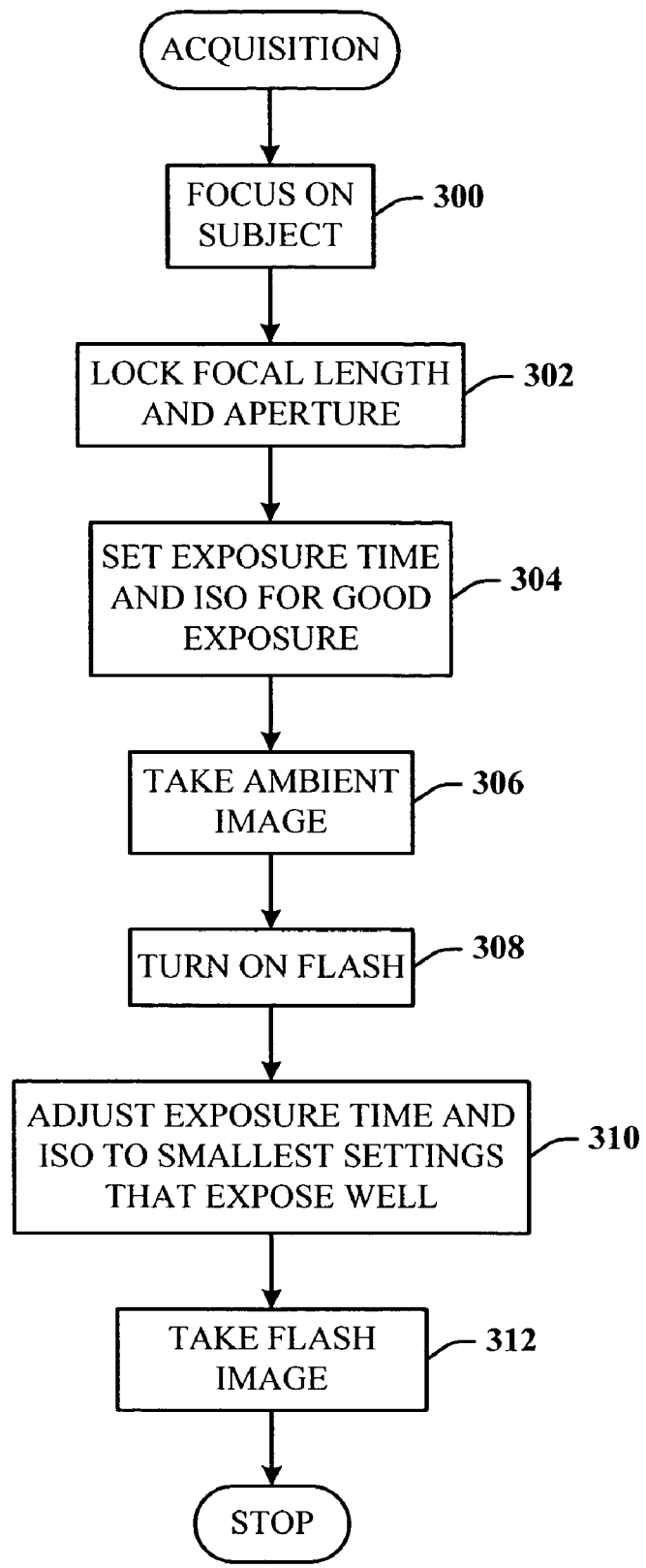
FIG. 3 illustrates a flow chart of one methodology of acquisition in accordance with the present invention.

Referring now to FIG. 3, there is illustrated a flow chart of one methodology of acquisition in accordance with the present invention. The disclosed algorithms are designed to work with images acquired using consumer-grade digital cameras. One goal of the acquisition procedure is to ensure that the flash/no-flash image pair capture exactly the same points in the scene. The focal length and aperture are fixed between the two images so that the camera focus and depth-of-field remain constant. One implementation of an acquisition procedure is as follows. At 300, focus is made on the subject. At 302, the focal length and aperture are locked. At 304, the exposure time t and ISO are set for a good exposure. At 306, the ambient image A is captured. At 308, the flash is turned on. At 310, the exposure time t and ISO are adjusted to the smallest settings that still expose the image well. At 312, the flash image F is then taken. The process then reaches a Stop block.

In one implementation for handheld camera operation, exposure times for a single image are set for under $\frac{1}{30}^{th}$ of a second for a 30 mm lens to prevent motion blur. In another implementation, exposure times for both images are set to $\frac{1}{60}^{th}$ of a second or less, so that under ideal circumstances, both images could be shot one after another within the $\frac{1}{30}^{th}$ of a second limit for handheld camera operation. Although rapidly switching between flash and non-flash mode is not currently possible on consumer grade cameras, it is to be appreciated that this capability will eventually be included in camera firmware, and is contemplated as part of the present invention.

All images can be acquired in RAW digital format. Images can then be converted into lossless 16-bit TIFF images or lossy JPEG images. By default, some conventional cameras include conversion software that performs white balancing, gamma correction, and other nonlinear tone-mapping operations to produce perceptually pleasing images with good overall contrast. One or more of the disclosed algorithms are applied on these non-linear images in order to preserve their high quality tone-mapping characteristics in the final output images.

It is to be appreciated that image registration can be accomplished using conventional mechanical means such as a tripod setup. Registration is important for images taken with handheld cameras, since changing the camera settings (e.g., turning on the flash, and changing the ISO) often results in camera motion. Photographs taken without a tripod can also benefit from the disclosed invention. Image registration from handheld cameras can be performed algorithmically. Such an algorithm can be found in the following reference: U.S. Pat. No. 6,018,349 entitled "Patch-Based Alignment Method and Apparatus for Construction of Image Mosaics," by R. Szeliski and H. Shum, which issued Jan. 25, 2000.

Some of the disclosed algorithms analyze the image difference F-A to infer the contribution of the flash to the scene lighting. To make this computation meaningful, the images must be in the same linear space. Therefore, the conversion software can be set to generate linear TIFF images from the RAW data. Moreover, compensation for the exposure differences between the two images due to ISO settings and exposure times t can be performed. Where $A'^{Lin}$ and $F^{Lin}$ are defined as the linear images output by the converter utility, they can be put in the same space by computing:

$$A^{Lin} = A'^{Lin} \frac{ISO_F \Delta t_F}{ISO_A \Delta t_A}.$$

Note that unless the superscript Lin is included, F and A refer to the non-linear versions of the images.

Denoising and Detail Transfer

Denoising and detail transfer algorithms are designed to enhance the ambient image using information from the flash image. Both algorithms assume that the flash image is a good local estimator of the high frequency content in the ambient image. However, this assumption does not hold in shadow and specular regions caused by the flash, and can lead to artifacts. Artifact handling is described in greater detail herein below.

Reducing noise in photographic images has been a long-standing problem in image processing and computer vision. Conventional solutions include applying an edge-preserving smoothing filter to the image such as anisotropic diffusion or bilateral filtering. The bilateral filter is a fast, non-iterative technique, and has been applied to a variety of problems beyond image denoising, including tone mapping, separating illumination from texture, and mesh smoothing.

The disclosed ambient image denoising technique also builds on the bilateral filter.

Figure 4:
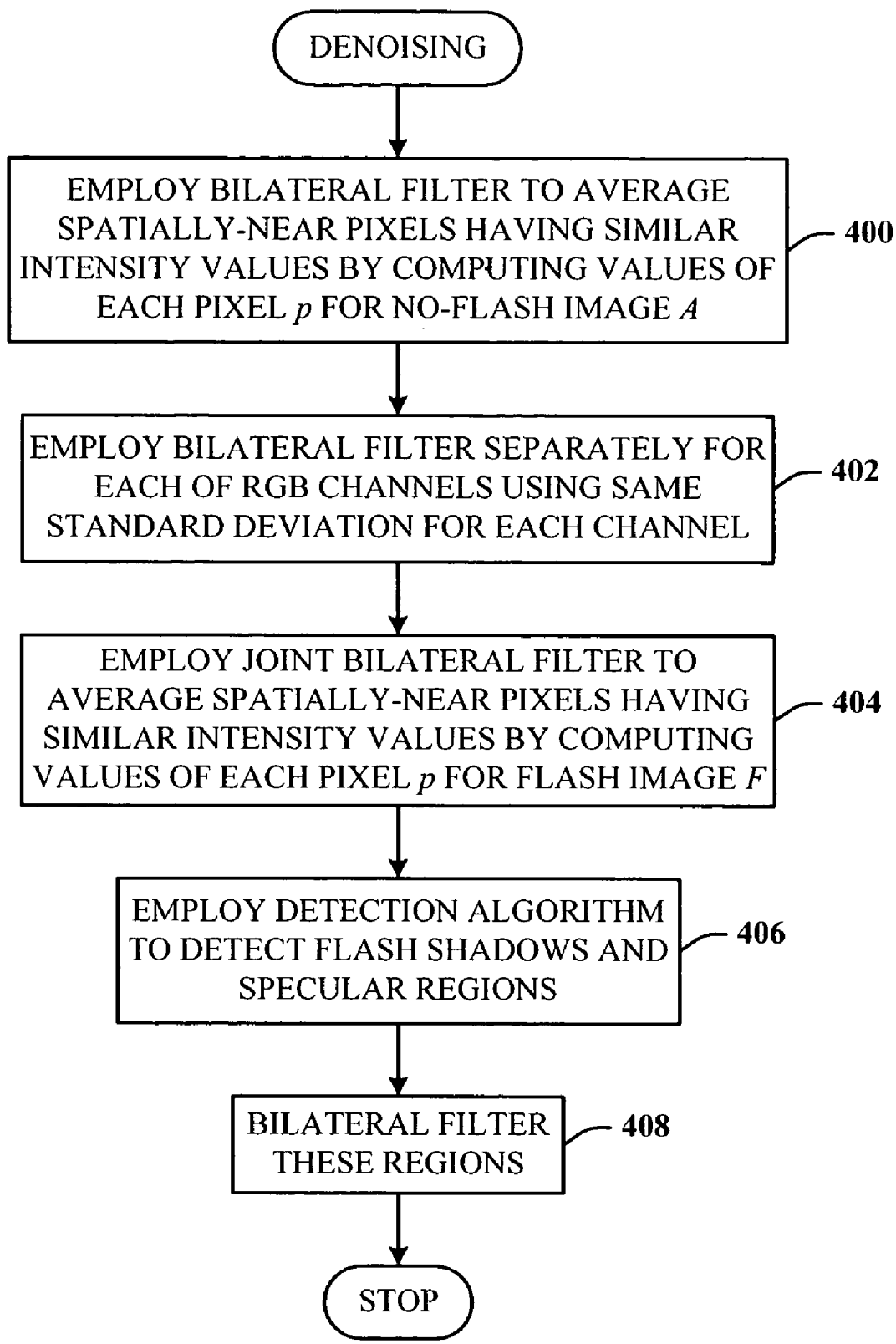
FIG. 4 illustrates a flow chart of one methodology for denoising in accordance with the present invention.

Referring now to FIG. 4, there is illustrated a flow chart of one methodology for denoising in accordance with the present invention. At 400, the bilateral filter is employed to average spatially-near pixels having similar intensity values by computing values of each pixel p for no-flash image A. It combines a classic low-pass filter with an edge-stopping function that attenuates the filter kernel weights when the intensity difference between pixels is large. As noted in the prior art, the bilateral filter computes the value of pixel p for ambient image A as:

$$A_p^{Base} = \frac{1}{k(p)} \sum_{p' \in \Omega} g_d(p' - p) g_r(A_p - A_{p'}) A_{p'},$$

where k(p) is a normalization term:

$$k(p) = \sum_{p' \in \Omega} g_d(p' - p) g_r(A_p - A_{p'}).$$

The function $g_d$ sets the weight in the spatial domain based on the distance between the pixels, while the edge-stopping function $g_r$ sets the weight on the range based on intensity differences. Typically, both functions are Gaussians with widths controlled by the standard deviation parameters $\sigma_d$ and $\sigma_r$, respectively.

At 402, the bilateral filter is applied to each RGB color channel separately with the same standard deviation parameters for all three channels. The challenge is to set $\sigma_d$ and $\sigma_r$ so that the noise is averaged away but detail is preserved. In practice, for six megapixel images, $\sigma_d$ is set to cover a pixel neighborhood of between 24 and 48 pixels, and then experimentally adjust $\sigma_r$ so that it is just above the threshold necessary to smooth the noise. For images with pixel values normalized to [0.0, 1.0], $\sigma_r$ is set to lie between 0.05 and 0.1, or 5 to 10% of the total range. However, as shown hereinbelow in FIG. 7b, even after carefully adjusting the parameters, the basic bilateral filter tends to either over-blur (lose detail) or under-blur (fail to denoise) the image in some regions.

It was observed hereinabove that the flash image contains a much better estimate of the true high-frequency information than the ambient image. Based on this observation, the basic bilateral filter is modified to compute the edge-stopping function $g_r$ using the flash image F instead of A, which technique called the joint bilateral filter. At 404, the joint bilateral filter is employed to average spatially near pixels having similar intensity values by computing values of each pixel p for the flash image F, described as follows:

$$A_p^{NR} = \frac{1}{k(p)} \sum_{p' \in \Omega} g_d(p' - p) g_r(F_p - F_{p'}) A_{p'},$$

where k(p) is modified similarly. Here $A^{NR}$ is the noise-reduced version of A. $\sigma_d$ is set as before for the basic bilateral filter. Under the assumption that F has little noise, $\sigma_r$ can be set to be very small and still ensure that the edge-stopping function $g_r(F_p - F_{p'})$, will choose the proper weights for nearby pixels, and therefore, will not over-blur or under-blur the ambient image. In practice, $\sigma_r$ can be set to 0.1% of the total range of color values. Unlike basic bilateral filtering, $\sigma_r$ is fixed for all images.

The joint bilateral filter relies on the flash image as an estimator of the ambient image. Therefore, it can fail in flash shadows and specularities because they only appear in the flash image. At the edges of such regions, the joint bilateral filter may under-blur the ambient image since it will down-weight pixels where the filter straddles these edges. Similarly, inside these regions, it may over-blur the ambient image. At 406, this problem is solved by first detecting flash shadows and specular regions, and then falling back to basic bilateral filtering within these regions, as indicated at 408. The process then reaches a Stop block.

Given the mask M produced by our detection algorithm, our improved denoising algorithm becomes:

$$A^{NR'} = (1-M)A^{NR} + MA^{BASE}.$$

Figure 7A:
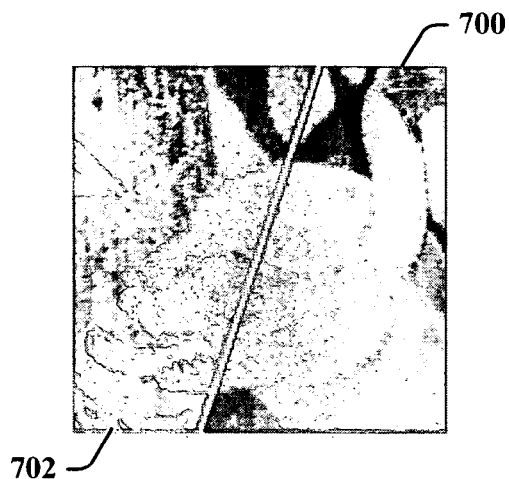
FIG. 7a illustrates a close-up of a flash image and a no-flash image of a Belgian tapestry.
Figure 7B:
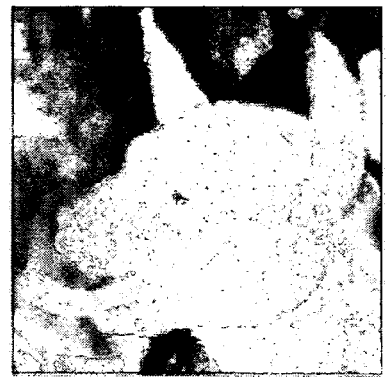
FIG. 7b shows a denoised image via basic bilateral filtering to preserve strong edges, but blurs away most of the threads.
Figure 7C:
FIG. 7c shows a denoised image using joint bilateral filtering.

The results of denoising with the joint bilateral filter are shown in FIG. 7c. The difference image with the basic bilateral filter in FIG. 7d, reveals that the joint bilateral filter is better able to preserve detail while reducing noise. Since both bilateral and joint bilateral filtering is nonlinear, a straight-forward implementation requires performing the convolution in the spatial domain. This can be very slow for large $\sigma_d$. One conventional implementation for accelerating the denoising algorithm uses Fourier techniques. This technique is also applicable to the joint bilateral filter and can significantly speed up the disclosed denoising algorithm.

Figure 5:
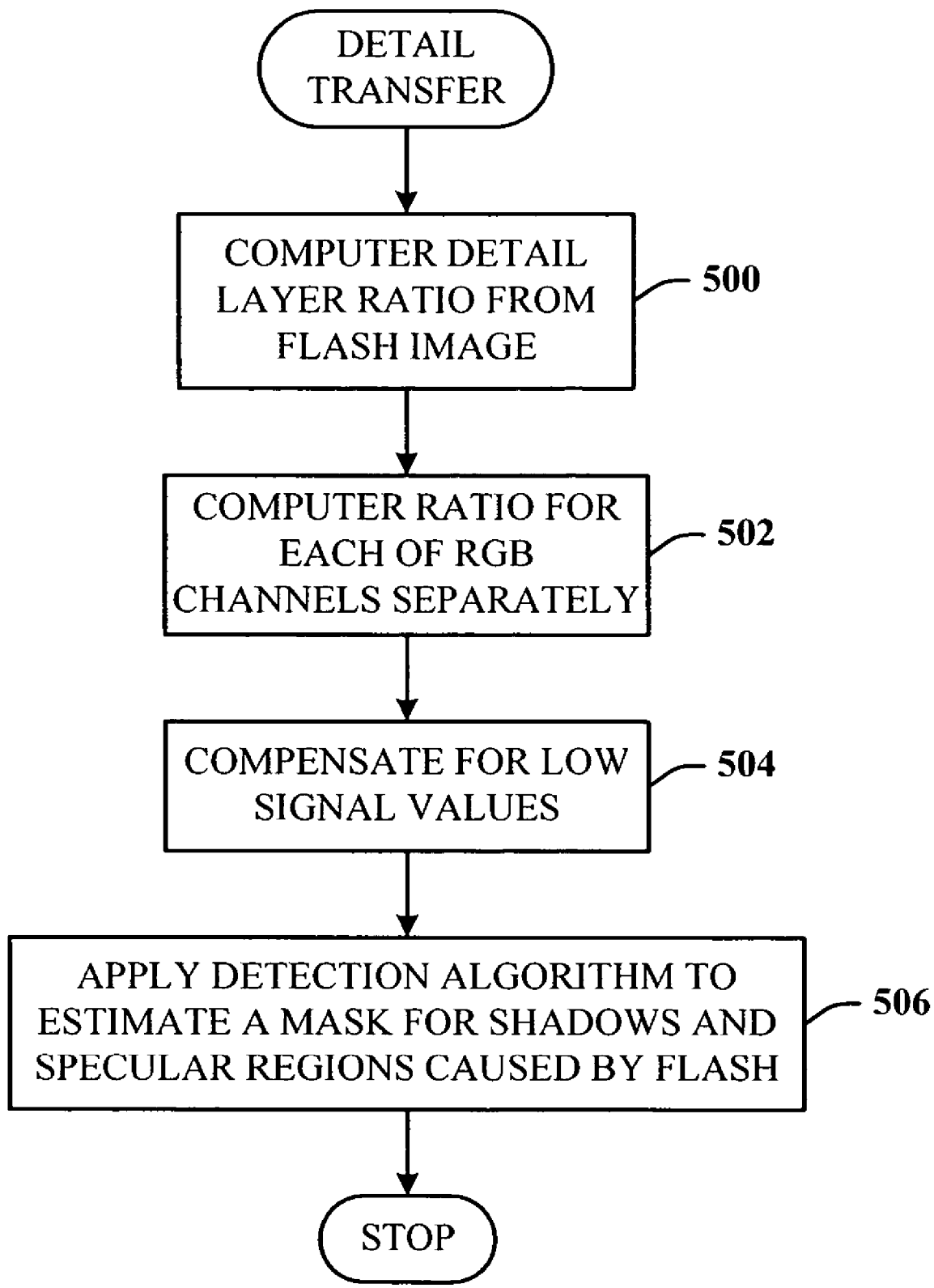
FIG. 5 illustrates a flow chart of one methodology for detail transfer in accordance with the present invention.

Referring now to FIG. 5, there is illustrated a flow chart of one methodology for detail transfer in accordance with the present invention. While the joint bilateral filter can reduce noise, it cannot add detail that may be present in the flash image. Yet, as described hereinabove, the higher SNR of the flash image allows it to retain nuances that are overwhelmed by noise in the ambient image. Moreover, the flash typically provides strong directional lighting that can reveal additional surface detail that is not visible in more uniform ambient lighting. The flash may also illuminate detail in regions that are in shadows in the ambient image. To transfer this detail, at 500, a detail layer is computed from the flash image as the following ratio:

$$F^{Detail} = \frac{F + \varepsilon}{F^{Base} + \varepsilon},$$

where $F^{Base}$ is computed using the basic bilateral filter on F. The ratio is computed on each RGB channel separately and is independent of the signal magnitude and surface reflectance, as indicated at 502. The ratio captures the local detail variation in F and is commonly called a quotient image or ratio image in computer vision. An advantage of using the bilateral filter to compute $F^{Base}$ rather than a classic low-pass Gaussian filter is for reducing haloing. A Gaussian low-pass filter blurs across all edges and will therefore create strong peaks and valleys in the detail image that cause halos. The bilateral filter does not smooth across strong edges and thereby reduces halos, while still capturing detail.

At low signal values, the flash image contains noise that can generate spurious detail. At 504, the algorithm compensates for low signal values by adding value ε to both the numerator and denominator of the ratio to reject these low signal values, and thereby reduce such artifacts (and also avoid division by zero). In practice ε=0.02 is used across all results. To transfer the detail, the noise-reduced ambient image $A^{NR}$ is multiplied by the ratio $F^{Detail}$. FIG. 7e and FIG. 7f show examples of a detail layer and detail transfer.

Just as in joint bilateral filtering, the transfer algorithm can produce a poor detail estimate in shadows and specular regions caused by the flash. Therefore, at 506, the detection algorithm is applied to estimate a mask M identifying these regions and compute the final image as:

$$A^{Final} = (1-M)A^{NR}F^{Detail} + MA^{Base}.$$

With this detail transfer approach, the amount of detail transferred can be controlled by choosing appropriate settings for the bilateral filter parameters $\sigma_d$ and $\sigma_r$ used to create $F^{Base}$. As the filter widths increase, increasingly smoother versions of $F^{Base}$ are generated and, as a result, capture more detail in $F^{Detail}$. However, with excessive smoothing, the bilateral filter essentially reduces to a Gaussian filter and leads to haloing artifacts in the final image.

Depending on the scene, the extreme levels of noise can require the use of relatively wide Gaussians for both the domain and range kernels in the joint bilateral filter. Thus, when transferring back the true detail from the flash image, a relatively wide Gaussians was used in computing the detail layer. As a result, it is possible to see small halos around the edges of the bottles illustrated in FIG. 9b. Nevertheless, the disclosed architecture is able to smooth away the noise while preserving detail.

In most cases, the detail transfer algorithm improves the appearance of the ambient image. However, it is important to note that the flash image may contain detail that looks unnatural when transferred to the ambient image. For example, if the light from the flash strikes a surface at a shallow angle, the flash image may pick up surface texture (e.g., wood grain, and stucco) as detail. If this texture is not visible in the original ambient image, it may look odd. Similarly if the flash image washes out detail, the ambient image may be over-blurred. The disclosed algorithms allow the user to control how much detail is transferred over the entire image. In another implementation, the amount of local detail transferred is automatically adjusted.

Figure 6:
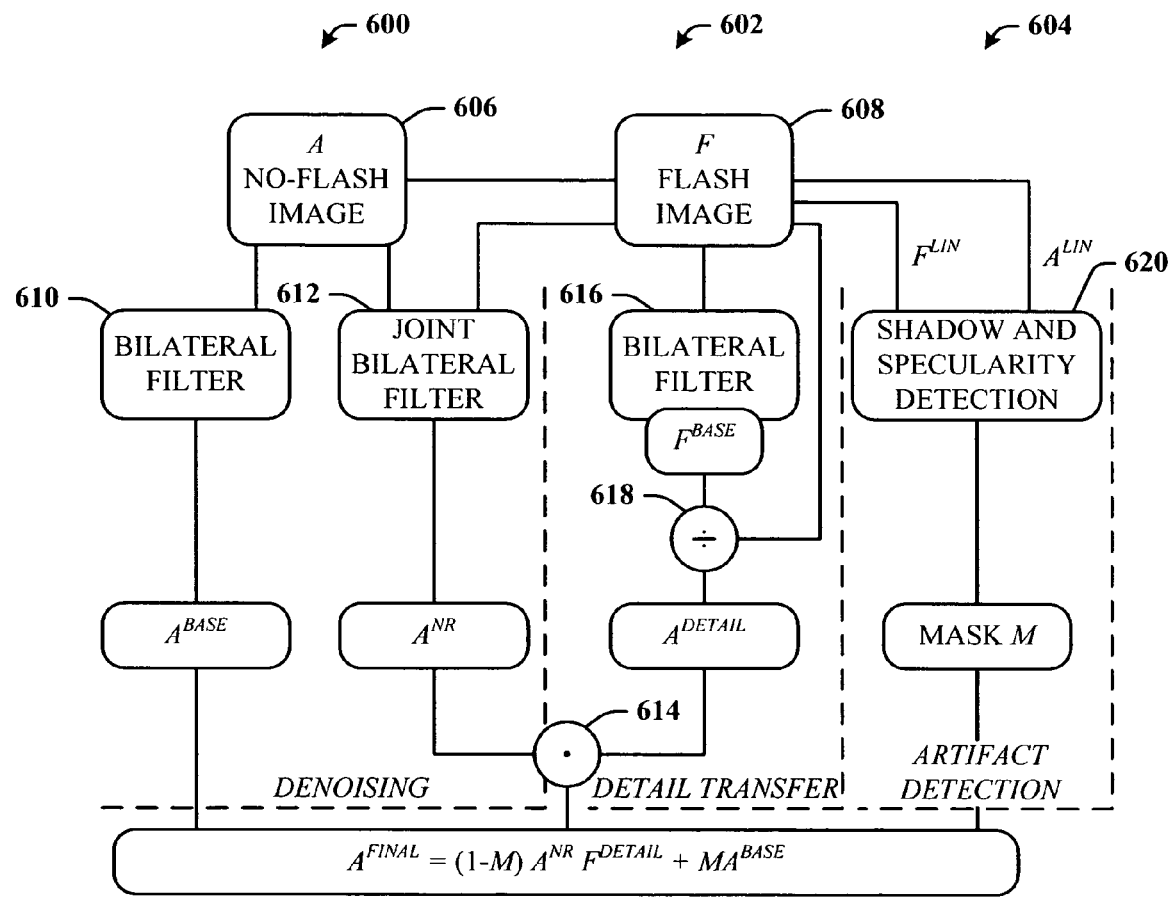
FIG. 6 illustrates an overview of a denoising algorithm, a detail transfer algorithm, and flash artifact detection algorithm that operate on a no-flash image and a flash image, in accordance with the present invention.

Referring now to FIG. 6, there is illustrated an overview of a denoising algorithm 600, a detail transfer algorithm 602, and flash artifact detection algorithm 604 that operate on a no-flash image 606 and a flash image 608, in accordance with the present invention. The ambient (or no-flash) image 606 is processed using both a first bilateral filter 610 and a joint bilateral filter 612, the respective outputs of which are $A^{BASE}$ and $A^{NR}$. Another input to the joint bilateral filter 612 is the flash image 608. The joint bilateral filter 612 receives these inputs and outputs the $A^{NR}$ value to a product process 614.

The detail transfer algorithm 602 uses the flash image 608 as an input to a second bilateral filter 616, the output of which is $F^{BASE}$. A division process 618 takes as inputs the $F^{BASE}$ value and the flash image 608, and outputs the $A^{DETAIL}$ value to the product process 614.

The artifact detection algorithm 604 includes a shadow and specularity detection algorithm 620 that receives as input $F^{LIN}$ and $A^{LIN}$ from the flash image 608, since the flash image 608 interfaces to the no-flash image 606. An output of the shadow and specularity detection algorithm is the Mask M.

Mask M, $A^{BASE}$ and, the product of $A^{NR}$ and $A^{DETAIL}$ combine to form the final image $A^{FINAL}$.

Figure 7D:
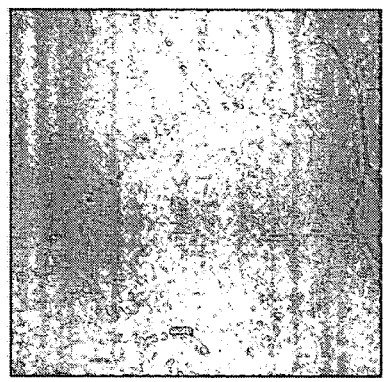
FIG. 7d shows the difference image between the basic and joint bilateral filtered images.
Figure 7E:
FIG. 7e shows an example of a detail layer.
Figure 7F:
FIG. 7f shows an example of a detail transfer.

Referring now to FIGS. 7a-f, there are illustrated process shots generated from flash/no-flash images in accordance with the present invention. FIG. 7a is close-up of a flash image 700 and a no-flash image 702 of a Belgian tapestry. The no-flash image 702 is especially noisy in the darker regions and does not show the threads as well as the flash image 700. FIG. 7b shows a denoised image via basic bilateral filtering to preserve strong edges, but blurs away most of the threads. FIG. 7c shows a denoised image using joint bilateral filtering. Joint bilateral filtering smoothes the noise while also retaining more thread detail than the basic bilateral filter. FIG. 7d shows the difference image between the basic and joint bilateral filtered images. FIG. 7e show the generated detail layer. The ambient image is further enhanced by transferring detail from the flash image. The detail layer is first computed from the flash image, and then combined with the image denoised via the joint bilateral filter to produce the detail-transferred image, as illustrated in FIG. 7f. The difference image with the basic bilateral filter of FIG. 7d reveals that the joint bilateral filter is better able to preserve detail while reducing noise.

Figure 8A:
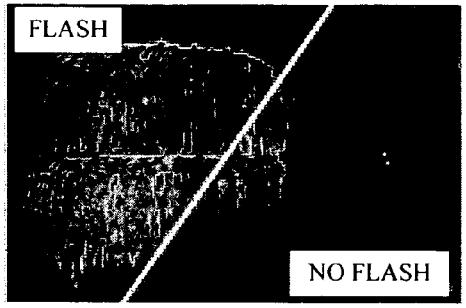
FIG. 8a shows a flash image and a no-flash image of an old European lamp made of hay.
Figure 8B:
FIG. 8b illustrates a small section of the image that is examined for final results.
Figure 8C:
FIG. 8c shows the flash version of the section of FIG. 8b
Figure 8D:
FIG. 8d shows the no-flash version of the section of FIG. 8b.
Figure 8E:
FIG. 8e shows the detail transfer with denoising, that maintains the warm appearance, as well as the sharp detail.

Referring now to FIGS. 8a-e, there are illustrated shots of another example that employs detail transfer and denoising to maintain the original warm appearance in accordance with the present invention. In FIG. 8a, a flash image and a no-flash image are provided of an old European lamp made of hay. The flash image captures detail, but is gray and flat. The no-flash image captures the warm illumination of the lamp, but is noisy and lacks the fine detail of the hay. FIG. 8b illustrates a small section of the image that is examined for final results. FIG. 8c shows the flash version of the section. FIG. 8d shows the no-flash version of the section. FIG. 8e shows the detail transfer with denoising, that maintains the warm appearance, as well as the sharp detail.

Figure 9A:
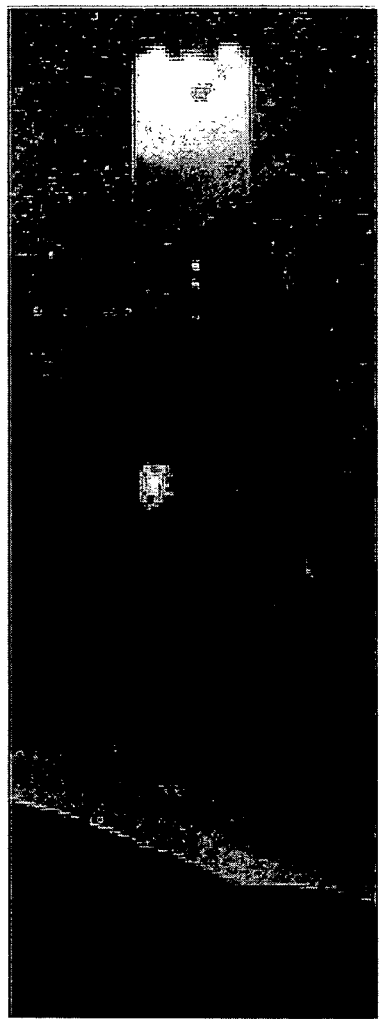
FIG. 9a shows a no-flash image.
Figure 9B:
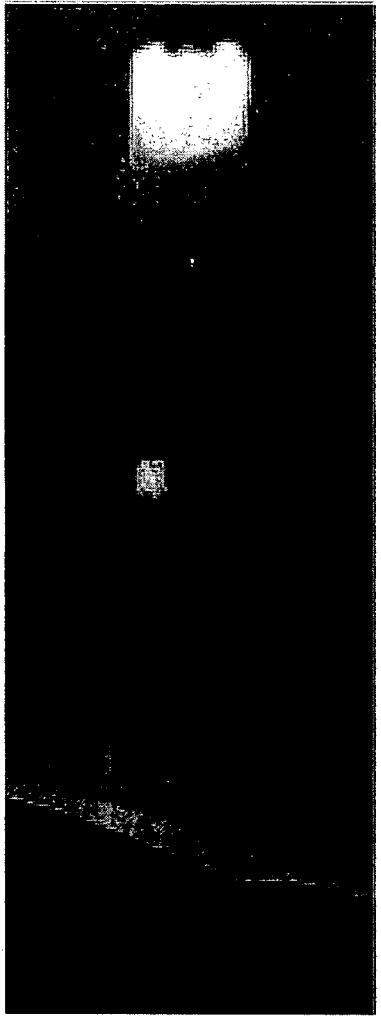
Figure 9C:
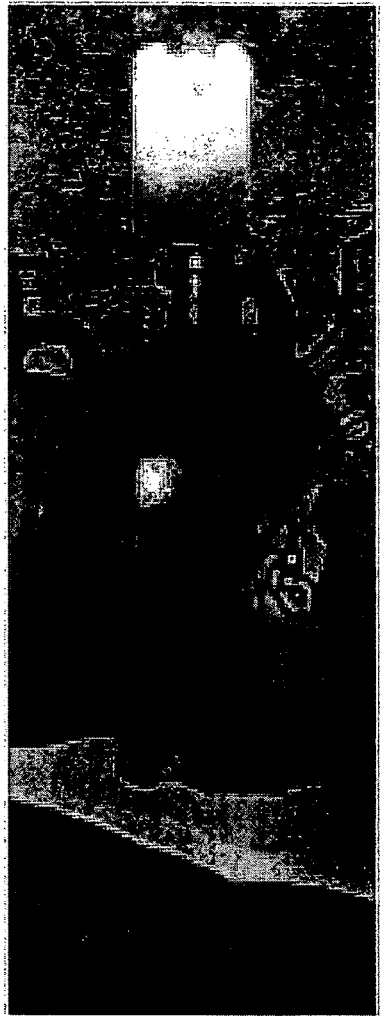
FIG. 9c shows a long exposure image of the wine cave scene (3.2 seconds at ISO 100) that is captured for comparison with detail transfer with denoising result of FIG. 9b.

Referring now to FIGS. 9a-c, there are illustrated shots of a long exposure reference to the detail transfer and denoising result of FIG. 8. FIG. 9a shows a no-flash image. FIG. 9b shows the detail transfer with denoising. FIG. 9c shows a long exposure image of the wine cave scene (3.2 seconds at ISO 100) that is captured for comparison with detail transfer with denoising result of FIG. 9b. Visual comparison shows that although the detail transfer result does not achieve the fidelity of the reference image, it is substantially less noisy than the original no-flash image.

Detecting Flash Shadows and Specularities

Light from the flash can introduce shadows and specularities into the flash image. Within flash shadows, the image may be as dim as the ambient image and therefore suffer from noise. Similarly, within specular reflections, the flash image may be saturated and lose detail. Moreover, the boundaries of both these regions may form high-frequency edges that do not exist in the ambient image. To avoid using information from the flash image in these regions, the flash shadows and specularities are first detected.

Figure 10:
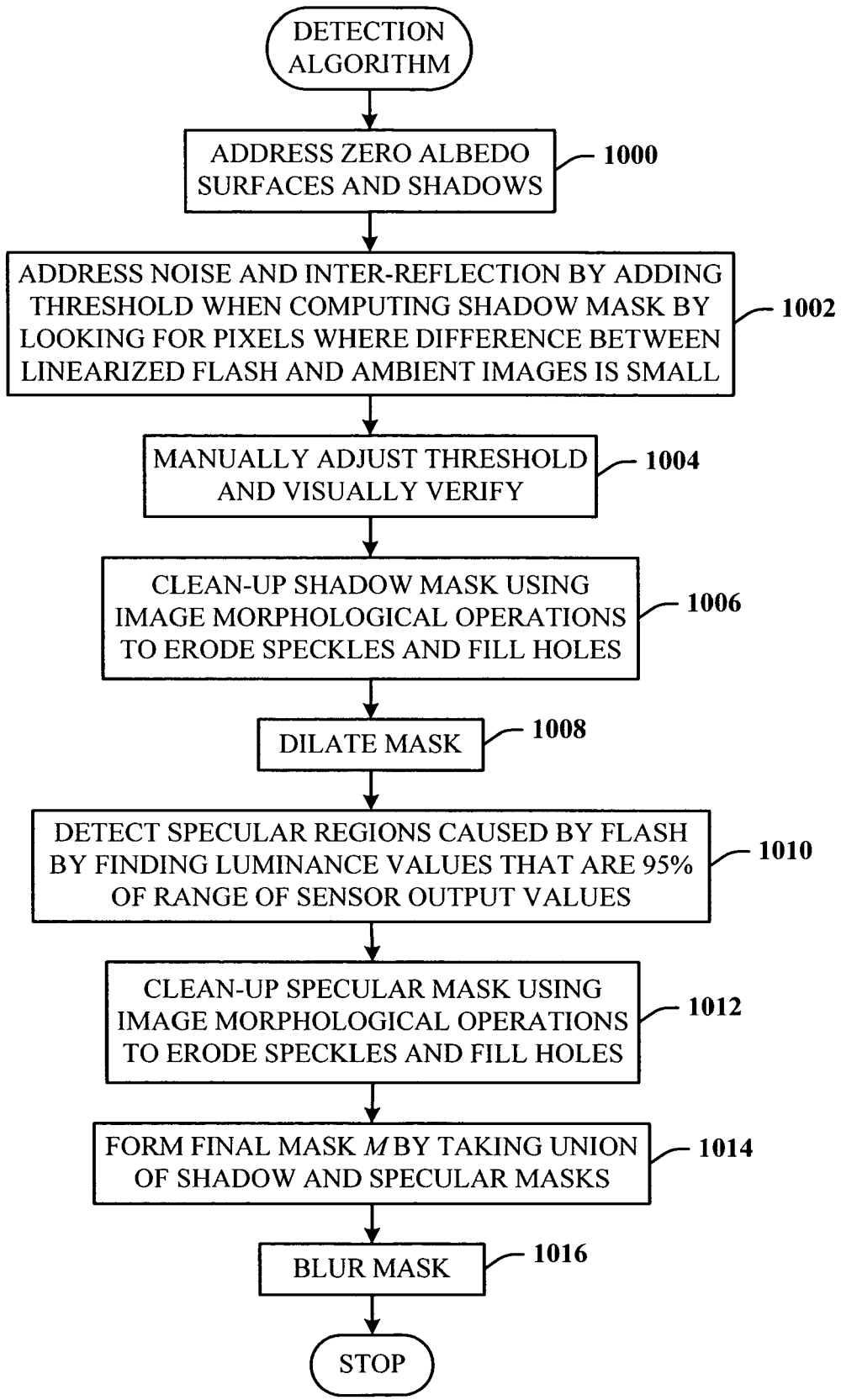
FIG. 10 illustrates a flow chart of one methodology for flash shadow and specularity detection in accordance with the present invention.

Referring now to FIG. 10, there is illustrated a flow chart of one methodology for flash shadow and specularity detection in accordance with the present invention. Since a point in a flash shadow is not illuminated by the flash, it should appear exactly as it appears in the ambient image. Ideally, A and F can be linearized as described hereinabove, and then pixels detected where the luminance of the difference image $F^{Lin} - A^{Lin}$ is zero. In practice, this approach is confounded by four issues: 1) surfaces that do not reflect any light (i.e., with zero albedo) are detected as shadows; 2) distant surfaces not reached by the flash are detected as shadows; 3) noise causes nonzero values within shadows; and 4) inter-reflection of light from the flash causes non-zero values within the shadow.

At 1000, zero albedo surfaces and shadows are addressed. The first two issues do not cause a problem since the results are the same in both the ambient and flash images, and thus, whichever image is chosen will give the same result. At 1002, noise and inter-reflection are addressed by adding a threshold when computing the shadow mask by looking for pixels in which the difference between the linearized flash and ambient images is small, according to the flowing conditions:

$$M^{Shad} = \begin{cases} 1, \text{ when } F^{Lin} - A^{Lin} \leq \tau_{Shad} \\ 0 \text{ else} \end{cases}.$$

One of the disclosed algorithms lets users interactively adjust the threshold value $\tau_{Shad}$ and visually verify that all the flash shadow regions are properly captured, as indicated at 1004.

Noise can contaminate the shadow mask with small speckles, holes and ragged edges. The shadow mask is cleaned up using image morphological operations to erode the speckles and fill the holes, as indicated at 1006. At 1008, to produce a conservative estimate that fully covers the shadow region, the mask is then dilated.

At 1010, specular regions caused by the flash are detected using a simple physically motivated heuristic. Specular regions should be bright in Lin F and should therefore saturate the image sensor. Hence, luminance values in the flash image that are greater than 95% of the range of sensor output values are sought. At 1012, cleaning, hole filling, and dilating of the specular mask are performed as before for the shadow mask. At 1014, the final mask M is formed by taking the union of the shadow and specular masks. At 1016, the mask is the blurred to feather its edges and prevent visible seams when the mask is used to combine regions from different images.

Referring now to FIG. 11, there are illustrated image shots for artifact processing in accordance with the present invention. FIG. 11a illustrates flash and no-flash images. FIG. 11b shows the detail transfer image for the no-flash image of FIG. 11a. FIG. 11c shows the detail transfer without Mask of the section of the flash image, where shadows are outlined at the arrows. FIG. 11d shows the shadow and specularity mask. FIG. 11e shows the detail transfer using the Mask of the same image of FIG. 11c. FIG. 11f shows a flash image of the small section indicated in the no-flash image of FIG. 11a. FIG. 11g shows the no-flash version of the same small section of FIG. 11f. FIG. 11h shows the detail transfer with denoising of the images of FIG. 11f and FIG. 11g.

Figures 11C, 11D, 11E:
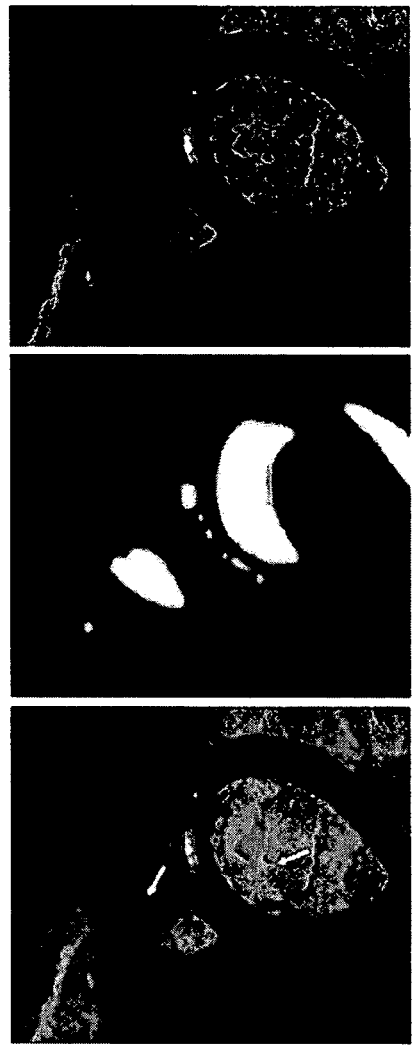
FIG. 11c shows the detail transfer without Mask of the section of the flash image, where shadows are outlined at the arrows.
FIG. 11d shows the shadow and specularity mask.
FIG. 11e shows the detail transfer using the Mask of the same image of FIG. 11c.
Figure 11A:
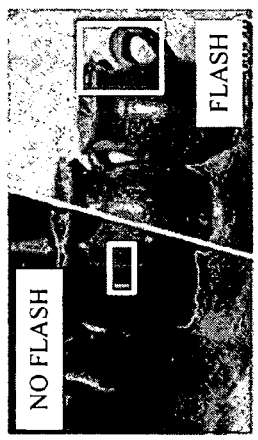
FIG. 11a illustrates flash and no-flash images.
Figure 11B:
Figure 11H:
FIG. 11h shows the detail transfer with denoising of the images of FIG. 11f and FIG. 11g.
Figure 11G:
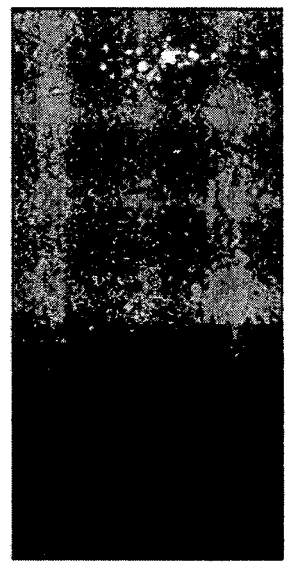
FIG. 11g shows the no-flash version of the same small section of FIG. 11f.
Figure 11F:
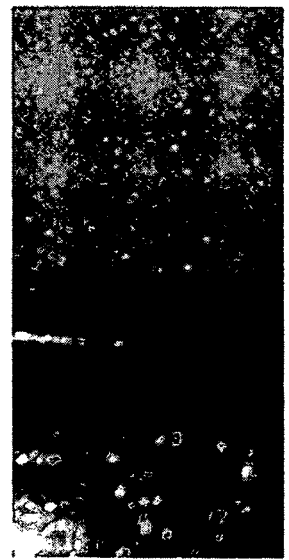

The flash image does not contain true detail information in shadows and specular regions. When naively applying the denoising and detail transfer algorithms, these regions generate artifacts, as indicated by the white arrows. To prevent these artifacts, basic bilateral filtering is employed within these regions. The dark brown pot on the left in the no-flash image of FIG. 11a is extremely noisy. The green pot on the right of FIG. 11a is also noisy, but as shown in the flash image of FIG. 11a, exhibits true texture detail. The detail transfer technique smoothes the noise while maintaining the texture, as shown in FIG. 11e. Note that the flash shadow/specularity detection algorithm properly masks out the large specular highlight on the brown pot of FIG. 11d and does not transfer that detail to the final image of FIG. 11e.

White Balancing

Although preserving the original ambient illumination is often desirable, sometimes it is also desirable to see how the scene would appear under a more "white" illuminant, in a process is called white-balancing.

When only a single ambient image is acquired, the ambient illumination must be estimated based on heuristics or user input. Digital cameras usually provide several white-balance modes for different environments such as sunny outdoors and fluorescent lighting. Most often, pictures are taken with an "auto" mode, wherein the camera analyzes the image and computes an image-wide average to infer ambient color. This is, of course, only a heuristic, and some researchers have considered semantic analysis to determine color cast.

A flash/no-flash image pair enables a better approach to white balancing. The disclosed architecture requires less setup than conventional processes by formulating white balancing as a continuous optimization problem that is not limited by the conventional discrete set of illuminants.

Figure 12:
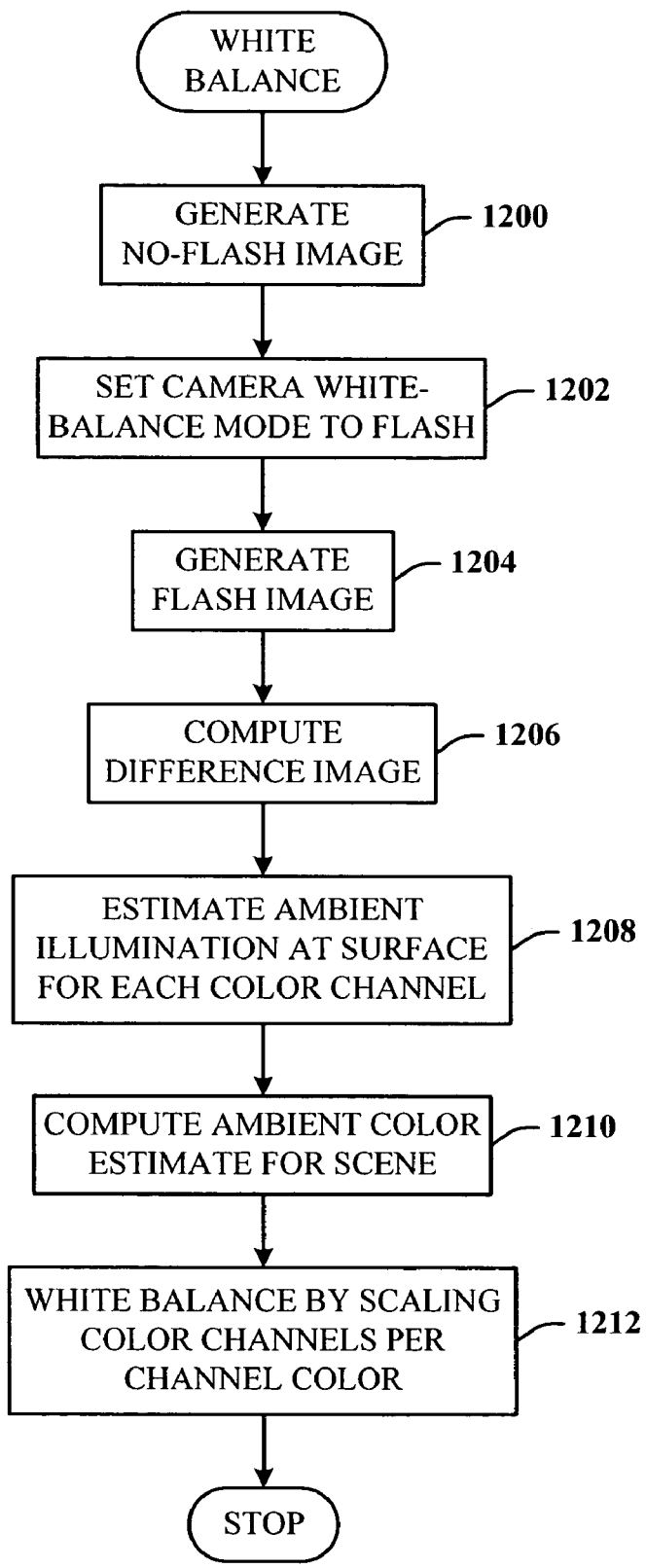
FIG. 12 illustrates a flow chart of one methodology for white balancing in accordance with the present invention.

Referring now to FIG. 12, there is illustrated a flow chart of one methodology for white balancing in accordance with the present invention. At 1200, the no-flash image is generated. At 1202, the white-balancing mode of the camera is set to flash. A flash can be considered as adding a point light source of known color to the scene. By setting the camera white-balance mode to "flash" (and assuming a calibrated camera), this flash color should appear as reference white in the acquired images. At 1204, the flash image is generated.

At 1206, the difference image is computed. The difference image $\Delta = F^{Lin} - A^{Lin}$ corresponds to the illumination due to the flash only, which is proportional to the surface albedo at each pixel p. Note that the albedo estimate Δ has unknown scale, because both the distance and orientation of the surface are unknown. It is assumed either that the surface is diffuse or that its specular color matches its diffuse color. As a counter-example, this is not true of plastics. Similarly, semitransparent surfaces would give erroneous estimates of albedo.

At 1208, the ambient illumination for each color channel is estimated. Since the surface at pixel p has color $A_p$ in the ambient image and the scaled albedo $\Delta_p$, the ambient illumination at the surface can be estimated with the following ratio:

$$C_p = \frac{\Delta_p}{A_p},$$

which is computed per color channel. Again, this estimated color $C_p$ has an unknown scale, so it is normalized at each pixel p. A goal is to analyze $C_p$ at all image pixels to infer the ambient illumination color c. To make this inference more robust, pixels for which the estimate has low confidence are discarded. This can be done since only a single color need be derived from millions of pixels. Specifically, pixels are ignored for which either $|A_p|<\tau_1$ or the luminance of $\Delta_p<\tau_2$ in any channel, since these small values make the ratio less reliable. Both $\tau_1$ and $\tau_2$ are set to about 2% of the range of color values.

Finally, at 1210, the ambient color estimate c for the scene is computed as the mean of $C_p$ for the non-discarded pixels. An alternative is to select c as the principal component of C, obtained as the eigenvector of $C^TC$ with the largest eigenvalue, and this gives a similar answer. Having inferred the scene ambient color c, the image is white-balanced, at 1212, by scaling the color channels as:

$$A_p^{WB} = \frac{1}{c} A_p.$$

Again, the computation is performed per color channel.

Referring now to FIGS. 13*a-c*, there are illustrated image shots associated with white-balancing an ambience image in accordance with the present invention. FIG. 13*a* shows an original no-flash image after denoising and detail transfer, but which still shows a cast. FIG. 13*b* shows the estimated ambient illumination colors and the estimated overall scene ambience. FIG. 13*c* shows that the white-balancing algorithm shifts the colors and removes a certain coloring (e.g., orange).

The white balancing significantly changes the overall hue of the image, setting the color of the wood table to a yellowish gray, as it would appear in white light. In inferring ambient color c, one could also prune outliers and look for spatial relationships in the image C. In addition, the scene may have multiple regions with different ambient colors, and these could be segmented and processed independently. White-balancing is a challenging problem because the perception of "white" depends in part on the adaptation state of the viewer. Moreover, it is unclear when white-balance is desirable. However, the disclosed estimation approach using the known information from the flash can be more accurate than techniques based on single-image heuristics.

Continuous Flash Adjustment

When taking a flash image, the intensity of the flash can sometimes be too bright, saturating a nearby object, or it can be too dim, leaving mid-distance objects under-exposed. With a flash and non-flash image pair, the present invention allows the user to adjust the flash intensity after the picture has been taken.

Figure 14:
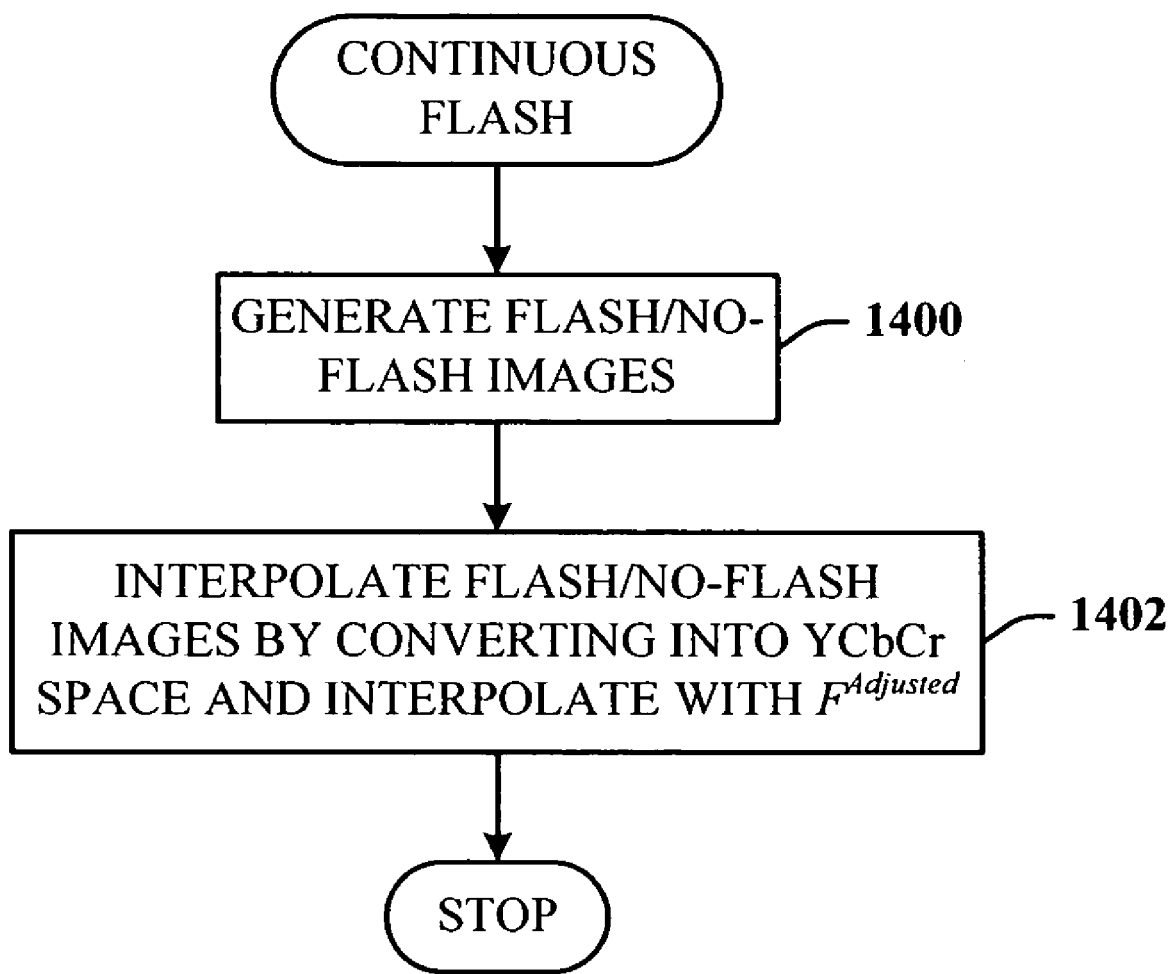
FIG. 14 illustrates a flow chart of one methodology for continuous flash adjustment in accordance with the present invention.

Referring now to FIG. 14, there is illustrated a flow chart of one methodology for continuous flash adjustment in accordance with the present invention. At 1400, the flash and no-flash images are generated. At 1402, the flash and no-flash images are interpolated. One way of interpolating the ambient and flash images is to convert the original flash/no-flash pair into YCbCr space, and then linearly interpolate them using:

$$F^{Adjusted} = (1-\alpha)A + (\alpha)F.$$

To provide more user control, extrapolation is allowed by letting the parameter $\alpha$ go outside the normal [0,1] range. However, only the Y channel is extrapolated, and the Cb and Cr channel interpolations are restricted to their extrema in the two original images to prevent excessive distortion of the hue. An example is shown in FIG. 15.

FIGS. 15*a-f* illustrate an example of continuous flash adjustment by extrapolation between flash and no-flash images. FIG. 15*a* shows an out-of-range extreme at the low end with a setting at −0.5. FIG. 15*b* shows the no-flash image at 0.0. FIG. 15*c* shows an extrapolated image with a 0.33 setting. FIG. 15*d* shows an extrapolated image with a 0.66 setting. FIG. 15*e* shows the flash image at the 1.0 setting. FIG. 15*f* shows an extrapolated image with an out-of-range extreme at the high end at 1.5.

Red-Eye Correction

Red-eye is a common problem in flash photography and is due to light reflected by a well vascularized retina. Fully automated redeye removal techniques conventionally assume a single image as input and rely on a variety of heuristic and machine-learning techniques to localize the red eyes. Once the pupil mask has been detected, these techniques darken the pixels within the mask to make the images appear more natural.

Figure 16:
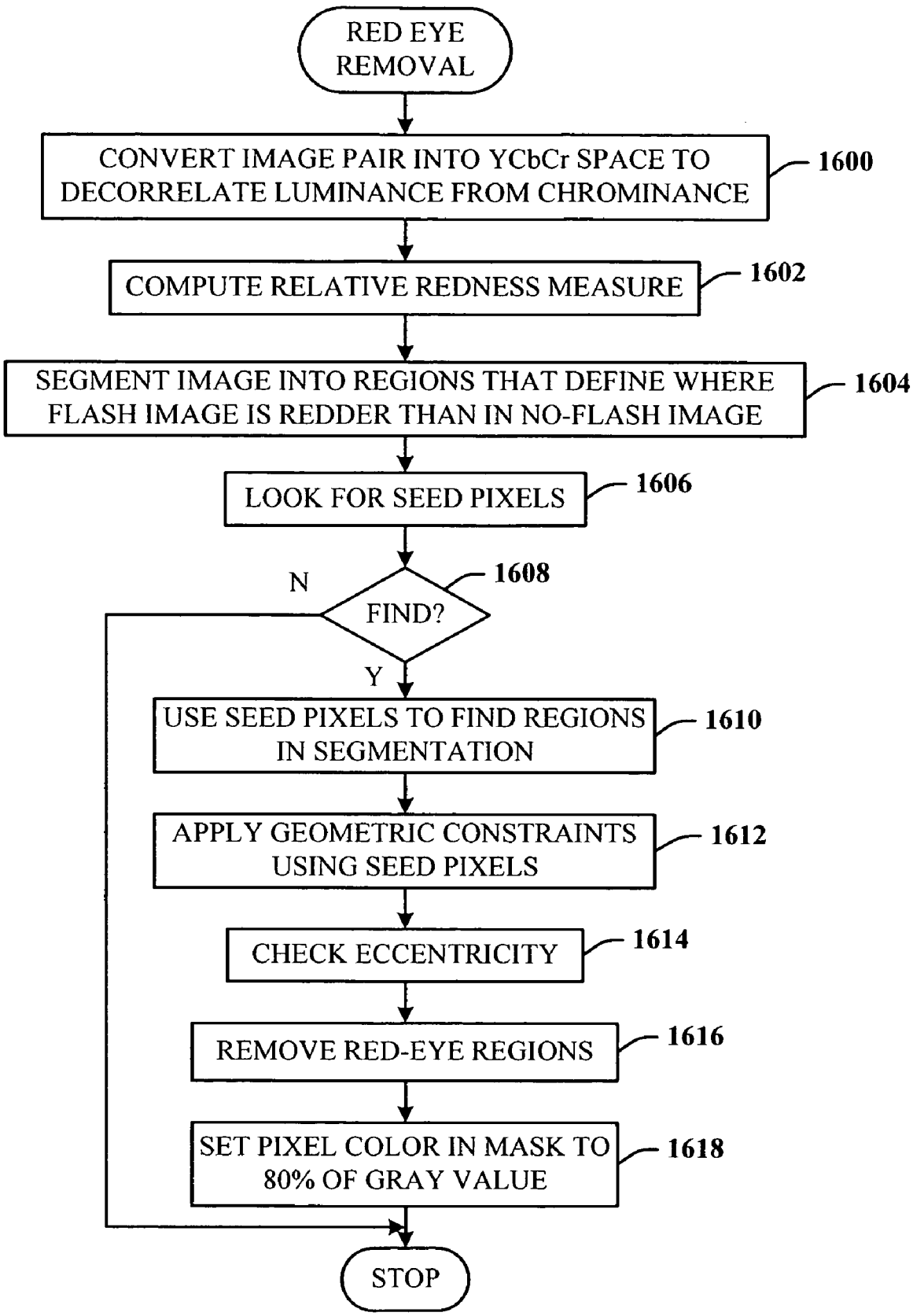
FIG. 16 illustrates a red-eye removal methodology in accordance with the present invention.

Referring now to FIG. 16, there is illustrated a red-eye removal methodology in accordance with the present invention. The red-eye removal algorithm of the present invention considers the change in pupil color between the ambient image (where it is usually very dark) and the flash image (where it may be red). At 1600, the image pair is converted into YCbCr space to decorrelate luminance from chrominance. At 1602, a relative redness measure is computed, as follows:

$$R = F_{Cr} - A_{Cr}.$$

At 1604, the image is initially segmented into regions where:

$$R > \tau_{Eye}.$$

The parameter $\tau_{Eye}$ is typically set to 0.05 so that the resulting segmentation defines regions where the flash image is more red than the ambient image, and therefore, may form potential red eyes. The segmented regions also tend to include a few locations that are highly saturated in the Cr channel of the flash image but are relatively dark in the Y channel of the ambient image. Thus, if $\mu_R$ and $\sigma_R$ denote the mean and standard deviation of the redness R, seed pixels are searched, as indicated at 1606, where:

$R > \max[0.6, \mu_R + 3\sigma_R]$ and $A_Y < \tau_{Dark}$, and where $\tau_{Dark}$ is typically set to 0.6.

At 1608, if no such seed pixels exist, it can be assumed that the image does not contain red-eye, and flow is to a Stop block. Otherwise, flow is to 1610, where the seed pixels are used to find the corresponding regions in the segmentation. At 1612, geometric constraints are applied to ensure that the regions are roughly the same size and elliptical. In particular, the area of each region is computed and large outliers discarded. At 1614, the eccentricity of the region is checked to ensure that it is greater than 0.75, which regions form a red-eye pupil mask. The red-eye regions are removed by first removing the highlights or "glints" in the pupil mask using the previously described flash specularity detection algorithm, as indicated at 1616. At 1618, the color of each pixel in the mask is set to the gray value equivalent to 80% of its luminance value. This approach properly darkens the pupil while maintaining the specular highlight which is important for maintaining realism in the corrected output. The process then reaches the Stop block.

In another implementation, an infrared flash can be employed. While infrared illumination yields incomplete color information, it does provide high-frequency detail, and does so in a less intrusive way than a visible flash.

Figure 17:
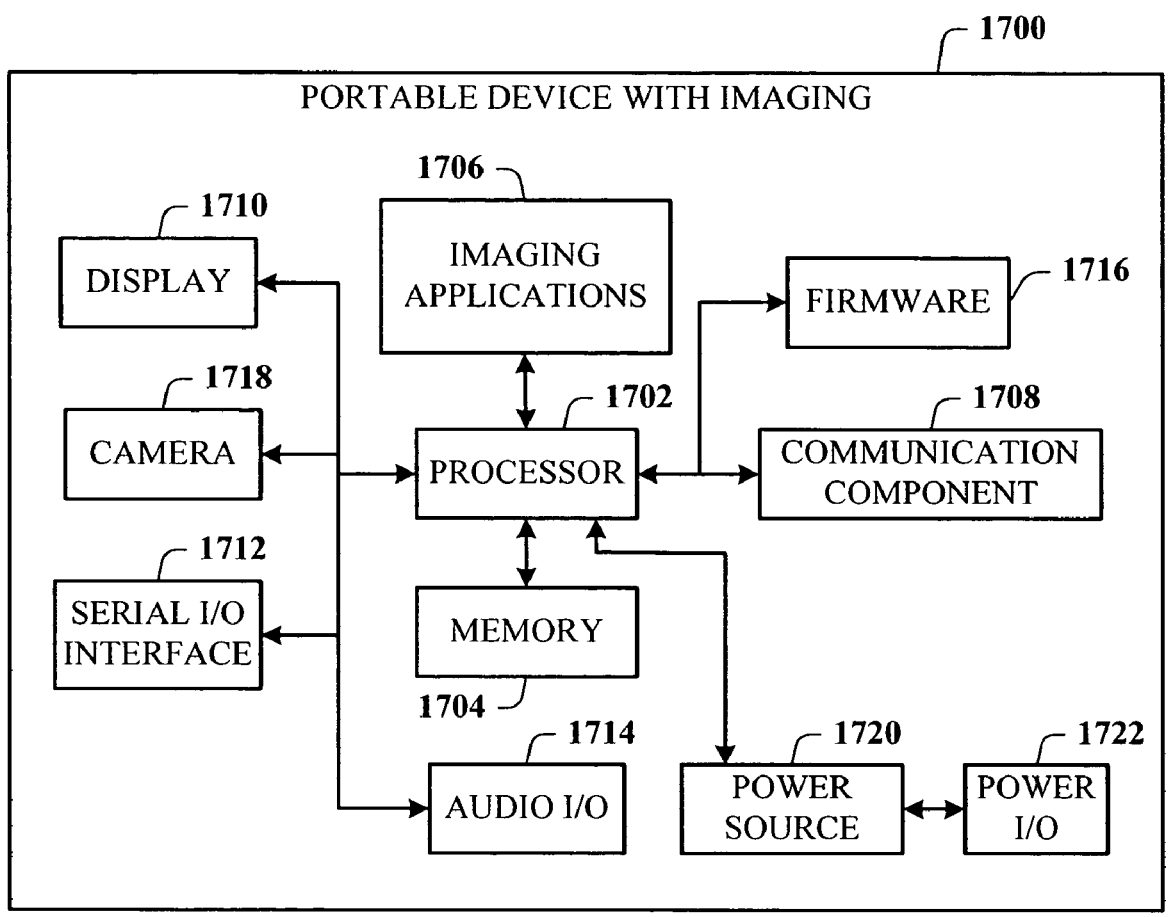
FIG. 17 illustrates a block diagram of a small form factor portable device that includes the image processing architecture of the present invention.

Referring now to FIG. 17, there is illustrated a block diagram of a small form factor portable device 1700 that includes the image processing architecture of the present invention. The device 1700 includes a processor 1702 for controlling all onboard operations and processes. A memory 1704 interfaces to the processor 1702 for temporary storage of data and one or more device applications 1706 for image processing in accordance with the present invention being executed by the processor 1702.

A communications component 1708 interfaces to the processor 1702 to facilitate wired/wireless communication with suitable external systems. This can include IEEE 802.11-based wireless communications and telecommunications signals based on conventional air protocols for mobile telephone signals.

The device 1700 can include a display 1710 for presenting at least image content captured in accordance with the present invention. The display 1710 can also facilitate the presentation of setup and configuration information for operating the device 1700 in the form of text and or graphics for using the device features. A serial I/O interface 1712 is provided in communication with the processor 1702 to facilitate serial communication (e.g., USB, and/or IEEE 1394) via a hardwire connection. This supports updating and troubleshooting, and uploading/downloading image data to/from the device 1700, for example. Audio capabilities are provided with an audio I/O component 1714, which can include a speaker for the output of audio signals related to, for example, recorded data or telephony voice data, and a microphone for inputting voice signals for recording and/or telephone conversations.

The device 1700 can include firmware 1716 to provide non-volatile storage and and access to the processor 1702 of startup and operation instructions.

The device 1700 can also include an image capture subsystem 1718 that includes an image capture subsystem such as a CCD (Charge Coupled Device) or CMOS (Complementary Metal Oxide Semiconductor) imager, for example. The image capture subsystem 1718 includes suitable memory and buffering capability to support rapid successive imaging of an object and/or scene for both flash and no-flash imaging and processing in accordance with the present invention. In one implementation, the subsystem 1718 can include the capability to provide flash and no-flash images by interleaved scanning of the object or scene. That is, the flash image is captured by the odd pixel lines and the no-flash image is captured according to the even pixel lines of the imager. In another implementation, the imaging subsystem comprises twin capture subsystems such that the flash image is captured by a first subsystem and the no-flash image is captured a second subsystem. In any case, the flash/no-flash images are captured in rapid succession of one another. In yet another implementation, a single buffer is provided that captures successive images taken in rapid succession by the imaging subsystem that takes the ambient image and then the flash image, or vice versa, with suitable time therebetween to provide the desired flash/no-flash images.

The display 1710 can be a pixel-based display (e.g., an LCD) such that the imaging subsystem 1718 supports a double pixel buffered CCD/CMOS design for processing multiple images in accordance with the present invention.

Given that the device 1700 include the communications component 1708, a user can then take digital pictures, and transmit the pictures to a remote location or store the pictures locally. The device 1700 can also include a power source 1720 in the form of batteries, which power source 1720 can also interface to an external power system or charging equipment via a power I/O component 1722.

The device software 1706 can also include one or more programs such as an operating system for configuring and manipulating local data and settings, a browser for interacting with websites, music players, video player software, and any other software suitable for operation on the device 1000.

The device 1700 can be a digital camera, an MP3 player with image capture capability, a cellular telephone with a built-in digital camera, a PDA (person digital assistant), or any such portable device suitably designed to accommodate multi-image processing in accordance with the present invention.

Figure 18:
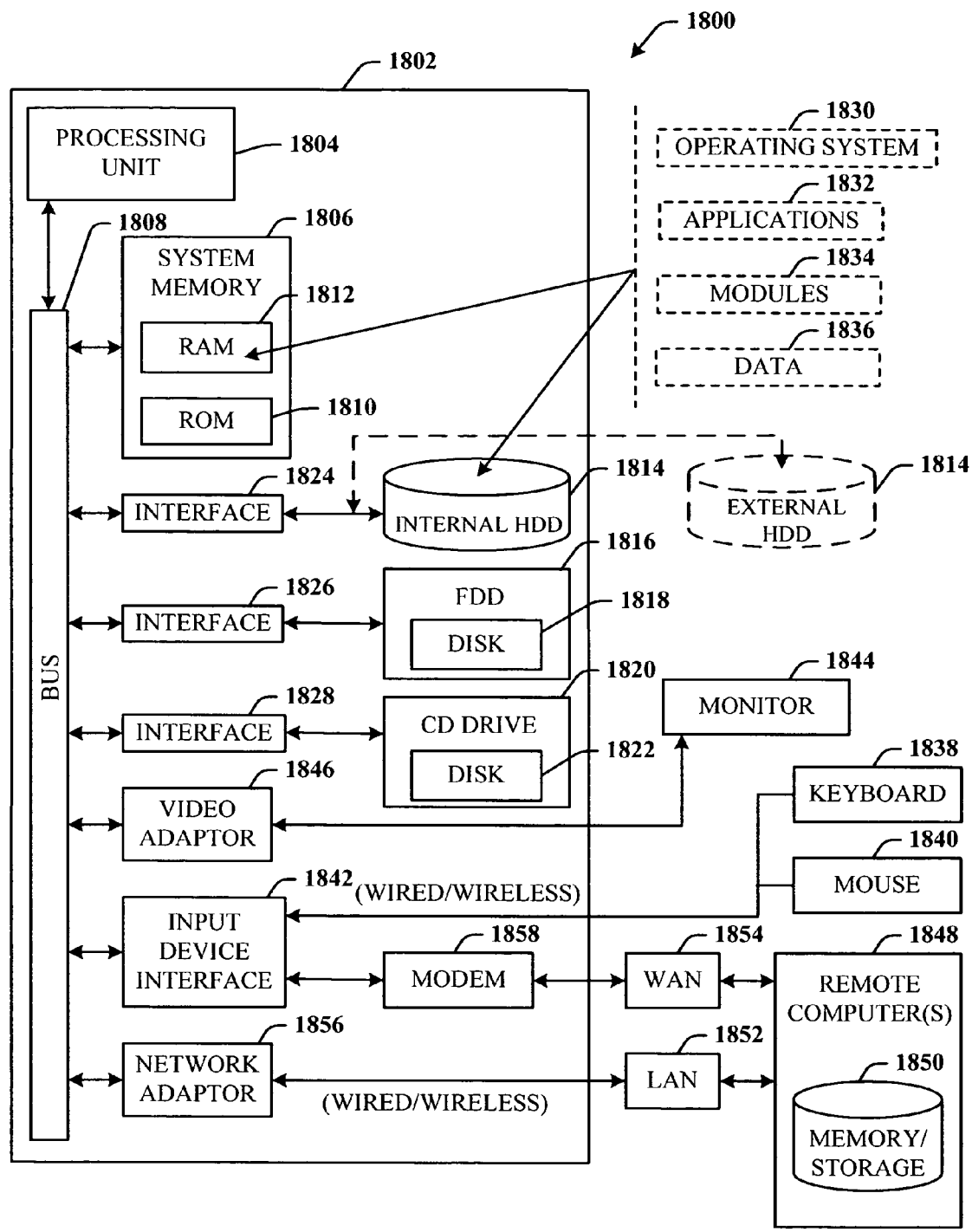
FIG. 18 illustrates a block diagram of a computer operable to execute the disclosed architecture.

Referring now to FIG. 18, there is illustrated a block diagram of a computer operable to execute the disclosed architecture. In order to provide additional context for various aspects of the present invention, FIG. 18 and the following discussion are intended to provide a brief, general description of a suitable computing environment 1800 in which the various aspects of the present invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 18, there is illustrated an exemplary environment 1800 for implementing various aspects of the invention that includes a computer 1802, the computer 1802 including a processing unit 1804, a system memory 1806 and a system bus 1808. The system bus 1808 couples system components including, but not limited to, the system memory 1806 to the processing unit 1804. The processing unit 1804 can be any of various commercially available processors. Dual microprocessors and other multi-processor architectures may also be employed as the processing unit 1804.

The system bus 1808 can be any of several types of bus structure that may further interconnect to a memory bus (with or without a memory controller), a peripheral bus, and a local bus using any of a variety of commercially available bus architectures. The system memory 1806 includes read only memory (ROM) 1810 and random access memory (RAM) 1812. A basic input/output system (BIOS) is stored in a non-volatile memory 1810 such as ROM, EPROM, EEPROM, which BIOS contains the basic routines that help to transfer information between elements within the computer 1802, such as during start-up. The RAM 1812 can also include a high-speed RAM such as static RAM for caching data.

The computer 1802 further includes an internal hard disk drive (HDD) 1814 (e.g., EIDE, SATA), which internal hard disk drive 1814 may also be configured for external use in a suitable chassis (not shown), a magnetic floppy disk drive (FDD) 1816, (e.g., to read from or write to a removable diskette 1818) and an optical disk drive 1820, (e.g., reading a CD-ROM disk 1822 or, to read from or write to other high capacity optical media such as the DVD). The hard disk drive 1814, magnetic disk drive 1816 and optical disk drive 1820 can be connected to the system bus 1808 by a hard disk drive interface 1824, a magnetic disk drive interface 1826 and an optical drive interface 1828, respectively. The interface 1824 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the present invention.

A number of program modules can be stored in the drives and RAM 1812, including an operating system 1830, one or more application programs 1832, other program modules 1834 and program data 1836. All or portions of the operating system, applications, modules, and/or data can also be cached in the RAM 1812.

It is appreciated that the present invention can be implemented with various commercially available operating systems or combinations of operating systems.

A user can enter commands and information into the computer 1802 through one or more wired/wireless input devices, e.g., a keyboard 1838 and a pointing device, such as a mouse 1840. Other input devices (not shown) may include a microphone, an IR remote control, a joystick, a game pad, a stylus pen, touch screen, or the like. These and other input devices are often connected to the processing unit 1804 through an input device interface 1842 that is coupled to the system bus 1808, but can be connected by other interfaces, such as a parallel port, an IEEE 1394 serial port, a game port, a USB port, an IR interface, etc.

A monitor 1844 or other type of display device is also connected to the system bus 1808 via an interface, such as a video adapter 1846. In addition to the monitor 1844, a computer typically includes other peripheral output devices (not shown), such as speakers, printers etc.

The computer 1802 may operate in a networked environment using logical connections via wired and/or wireless communications to one or more remote computers, such as a remote computer(s) 1848. The remote computer(s) 1848 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory storage device 1850 is illustrated. The logical connections depicted include wired/wireless connectivity to a local area network (LAN) 1852 and/or larger networks, e.g., a wide area network (WAN) 1854. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1802 is connected to the local network 1852 through a wired and/or wireless communication network interface or adapter 1856. The adaptor 1856 may facilitate wired or wireless communication to the LAN 1852, which may also include a wireless access point disposed thereon for communicating with the wireless adaptor 1856. When used in a WAN networking environment, the computer 1802 can include a modem 1858, or is connected to a communications server on the LAN, or has other means for establishing communications over the WAN 1854, such as by way of the Internet. The modem 1858, which can be internal or external and a wired or wireless device, is connected to the system bus 1808 via the serial port interface 1842. In a networked environment, program modules depicted relative to the computer 1802, or portions thereof, can be stored in the remote memory/storage device 1850. It will be appreciated that the network connections shown are exemplary and other means of establishing a communications link between the computers can be used.

The computer 1802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11b) or 54 Mbps (802.11a) data rate or with products that contain both bands (dual band), so the networks can provide real-world performance similar to the basic 10BaseT wired Ethernet networks used in many offices.

Figure 19:
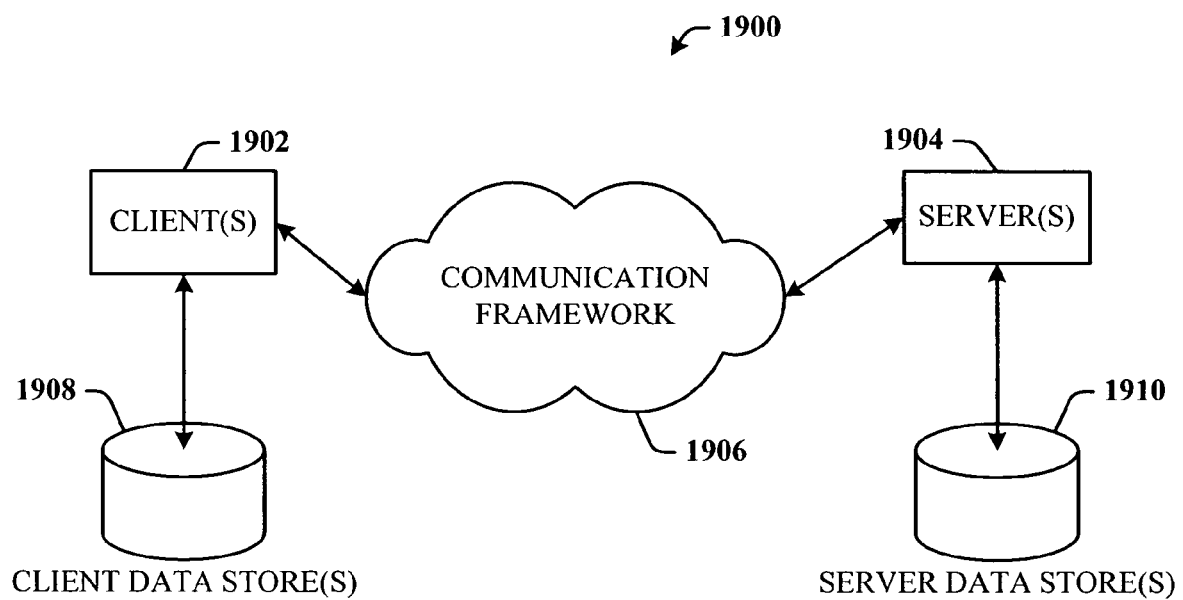
FIG. 19 illustrates a schematic block diagram of an exemplary computing environment in accordance with the present invention.

Referring now to FIG. 19, there is illustrated a schematic block diagram of an exemplary computing environment 1900 in accordance with the present invention. The system 1900 includes one or more client(s) 1902. The client(s) 1902 can be hardware and/or software (e.g., threads, processes, computing devices). The client(s) 1902 can house cookie(s) and/or associated contextual information by employing the present invention, for example. The system 1900 also includes one or more server(s) 1904. The server(s) 1904 can also be hardware and/or software (e.g., threads, processes, computing devices). The servers 1904 can house threads to perform transformations by employing the present invention, for example. One possible communication between a client 1902 and a server 1904 can be in the form of a data packet adapted to be transmitted between two or more computer processes. The data packet may include a cookie and/or associated contextual information, for example. The system 1900 includes a communication framework 1906 (e.g., a global communication network such as the Internet) that can be employed to facilitate communications between the client(s) 1902 and the server(s) 1904.

Communications can be facilitated via a wired (including optical fiber) and/or wireless technology. The client(s) 1902 are operatively connected to one or more client data store(s) 1908 that can be employed to store information local to the client(s) 1902 (e.g., cookie(s) and/or associated contextual information). Similarly, the server(s) 1904 are operatively connected to one or more server data store(s) 1910 that can be employed to store information local to the servers 1904.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates generation of digital images, comprising:
    a component that receives a plurality of digital images of an object, wherein at least two of the digital images have differing illumination components, and wherein the at least two of the plurality of digital images includes a flash image that includes high frequency spatial components and a no-flash image that includes low frequency spatial components;
    an image generation component that merges a subset of the received images to generate a new image of the object, the image generation component merges high frequency components of one input image with low frequency components of another input image in generating the new image, wherein the one input image is taken with flash lighting and the other input image is taken without flash lighting, and wherein the subset of images are taken consecutively within a predetermined time frame;
    a comparison component that identifies an image artifact by analyzing the at least two of the digital images, wherein the image artifact is red-eye, shadows, and noise, and wherein a mask is generated that identifies regions of the shadows and specularities;
    a cost component that applies a cost function to the frequency components to mitigate combining disagreeing frequency components, the cost component is part of an algorithm that first splits the flash/no flash images into respective low and high pass components, then the images are combined using the cost function which is expressed as a blending mask; and
    a bilateral filter and a joint-bilateral filter, the bilateral filter employed to average spatially near pixels having similar intensity values by computing values of each pixel for the no-flash image and the joint bilateral filter employed to average spatially near pixels having similar intensity values by computing values of each pixel for the flash image.

2. The system of claim 1, wherein one of the at least two digital images is taken with flash lighting.

3. The system of claim 1, wherein one of the at least two digital images is taken with flash lighting of higher intensity than a flash lighting for another image.

4. A digital camera comprising the system of claim 1.

5. The system of claim 1, wherein the at least two of the digital images comprise a flash and no-flash pair taken in rapid succession.

6. The system of claim 1, wherein color in one of the digital images is continuously corrected.

7. The system of claim 1, wherein the image generation component enhances one image by adding detail from another image.

8. A portable wireless communications device comprising the system of claim 1.

9. A computer storage media having stored thereon computer executable instructions for carrying out the system of claim 1.

10. A system that facilitates generation of digital images, comprising:
    a component that receives a plurality of digital images of an object, wherein at least two of the plurality of digital images have differing spatial frequency components;
    an image generation component that merges a subset of the received plurality of digital images to generate a new image of the object, wherein the one input image is taken with flash lighting and the other input image is taken without flash lighting, and wherein the flash lighting and no-flash lighting pair of input images are taken in rapid succession;
    a comparison component that identifies an image artifact by analyzing the at least two of the digital images;
    a cost component that applies a cost function to the frequency components to mitigate combining disagreeing frequency components, the cost component is part of an algorithm that first splits the flash/no flash images into respective low and high pass components, then the images are combined using the cost function which is expressed as a blending mask; and
    a bilateral filter and a joint-bilateral filter, the bilateral filter employed to average spatially near pixels having similar intensity values by computing values of each pixel for the no-flash image and the joint bilateral filter employed to average spatially near pixels having similar intensity values by computing values of each pixel for the flash image.

11. The system of claim 10, wherein the at least two of the plurality of digital images includes a flash image that includes high frequency spatial components and a no-flash image that includes low frequency spatial components.

12. A handheld computing device that employs the system of claim 10.

13. A computer storage media having computer-executable instructions for performing a method for facilitating the generation of digital images, the method comprising:
receiving a flash image and a no-flash image of an object;
denoising the no-flash image using the flash image;
transferring a detail of the flash image to the no-flash image;
outputting a new image of the object based on the flash image and the no-flash image;
merging high frequency components of the flash image with low frequency components of the no-flash image;
identifying an image artifact by analyzing the flash and no-flash images;
applying a cost function to the frequency components to mitigate combining disagreeing frequency components, wherein the cost function is part of an algorithm that first splits the flash/no flash images into respective low and high pass components, then the images are combined using the cost function which is expressed as a blending mask; and
employing a bilateral filter and a joint-bilateral filter, the bilateral filter employed to average spatially near pixels having similar intensity values by computing values of each pixel for the no-flash image and the joint bilateral filter employed to average spatially near pixels having similar intensity values by computing values of each pixel for the flash image.

14. The computer-readable medium of claim 13, further comprising performing white-balancing by using flash color of the flash image to white-balance the no-flash image.

15. The computer-readable medium of claim 13, further comprising performing red-eye correction by processing pupil color between the flash image and the no-flash image.

16. The computer-readable medium of claim 13, further comprising detecting flash shadows and specular regions.

17. The computer-readable medium of claim 13, the act of denoising further comprises estimating high-frequency information using the flash image.

18. The computer-readable medium of claim 13, the act of transferring further comprises:
detecting at least one of regions of shadows and specularities; and
generating a mask that identifies the regions.

19. The computer-readable medium of claim 18, further comprising interactively adjusting a threshold value related to the shadows.

20. A method of facilitating the generation of a digital image, comprising:
receiving a flash image and a no-flash image of an object;
denoising the no-flash image using the flash image;
outputting a new image based on the flash image and the no-flash image;
merging high frequency components of the flash image with low frequency components of the no-flash image;
identifying an image artifact by analyzing the digital image, wherein the image artifact is red-eye, shadows, and noise, and wherein a mask is generated that identifies regions of the shadows and specularities;
applying a cost function to the frequency components to mitigate combining disagreeing frequency components, wherein the cost function is part of an algorithm that first splits the flash/no flash images into respective low and high pass components, then the images are combined using the cost function which is expressed as a blending mask; and
employing a bilateral filter and a joint-bilateral filter, the bilateral filter employed to average spatially near pixels having similar intensity values by computing values of each pixel for the no-flash image and the joint bilateral filter employed to average spatially near pixels having similar intensity values by computing values of each pixel for the flash image.

21. The method of 20, the act of denoising further comprises:
filtering the no-flash image using a bilateral filter that averages pixels that are at least one of spatially-near and have similar intensity values; and
estimating high-frequency components of the flash image using a joint bilateral filter.

22. The method of 20, further comprising performing white-balancing by estimating ambient color illumination.

23. The method of claim 22, further comprising analyzing the estimated color illumination at a plurality of pixels of the no-flash image.

24. The method of 20, further comprising at least one of the acts of;
computing a detail layer from the flash image according to a ratio; and
detecting shadows and specularities in the flash image.

25. A method of facilitating the generation of a digital image, comprising:
receiving a flash image and a no-flash image of an object;
transferring a detail of the flash image to the no-flash image;
outputting a new image of the object based on the flash image and the no-flash image;
merging high frequency components of the flash image with low frequency components of the no-flash image;
identifying an image artifact by analyzing the flash and no-flash images;
applying a cost function to the frequency components to mitigate combining disagreeing frequency components, wherein the cost function is part of an algorithm that first splits the flash/no flash images into respective low and high pass components, then the images are combined using the cost function which is expressed as a blending mask; and
employing a bilateral filter and a joint-bilateral filter, the bilateral filter employed to average spatially near pixels having similar intensity values by computing values of each pixel for the no-flash image and the joint bilateral filter employed to average spatially near pixels having similar intensity values by computing values of each pixel for the flash image.

26. The method of claim 25, the act of receiving comprises obtaining the flash image and the no-flash image successively in less than $\frac{1}{30}$ second.

27. The method of claim 25, further comprising computing a detail layer of the flash image according to a ratio, which ratio is computed on at least one RGB channel.

28. The method of claim 27, the ratio is independent of signal magnitude and signal reflectance.

29. The method of claim 25, further comprising estimating a mask that identifies at least one of a shadow region and a specular region.

30. The method of claim 29, further comprising generating the mask by merging a mask of the shadow region and a mask of the specular region.

31. The method of claim 25, further comprising controlling an amount of the detail transferred using a filter.

* * * * *